(12) United States Patent
Tao et al.

(10) Patent No.: US 11,644,845 B2
(45) Date of Patent: May 9, 2023

(54) INDUSTRIAL VEHICLE WITH FEATURE-BASED LOCALIZATION AND NAVIGATION

(71) Applicant: Crown Equipment Corporation, New Bremen, OH (US)

(72) Inventors: Junli Tao, Auckland (NZ); Mark Bell, Auckland (NZ)

(73) Assignee: Crown Equipment Corporation, New Bremen, OH (US)

( * ) Notice: Subject to any disclaimer, the term of this patent is extended or adjusted under 35 U.S.C. 154(b) by 223 days.

(21) Appl. No.: 16/861,329

(22) Filed: Apr. 29, 2020

(65) Prior Publication Data

US 2020/0348673 A1 Nov. 5, 2020

Related U.S. Application Data

(60) Provisional application No. 62/842,032, filed on May 2, 2019.

(51) Int. Cl.
| | | |
|---|---|---|
| *G05D 1/02* | (2020.01) | |
| *B62D 15/02* | (2006.01) | |

(Continued)

(52) U.S. Cl.
CPC ....... *G05D 1/0246* (2013.01); *B62D 15/0265* (2013.01); *B66F 9/24* (2013.01); *G05D 1/0212* (2013.01); *G06V 10/22* (2022.01); *G06V 10/60* (2022.01); *G06V 20/56* (2022.01); *G05D 2201/0216* (2013.01)

(58) Field of Classification Search
CPC ......... G05D 2201/0216; G05D 1/0246; G05D 1/0088; G05D 1/0094; G05D 1/0234; G05D 1/024; G06T 7/73
See application file for complete search history.

(56) References Cited

U.S. PATENT DOCUMENTS

| | | | | |
|---|---|---|---|---|
| 9,174,830 | B1 * | 11/2015 | Bell | ..................... G05D 1/0088 |
| 9,880,009 | B2 * | 1/2018 | Bell | ..................... G05D 1/0246 |

(Continued)

OTHER PUBLICATIONS

International Search Report and Written Opinion dated Oct. 9, 2020 relating to International Appl. No. PCT/US2020/030414.

(Continued)

*Primary Examiner* — Redhwan K Mawari
(74) *Attorney, Agent, or Firm* — Dinsmore & Shohl LLP

(57) ABSTRACT

An industrial vehicle is provided comprising a drive mechanism, a steering mechanism, a vehicle controller, a camera, and a navigation module. The camera is communicatively coupled to the navigation module, the vehicle controller is responsive to commands from the navigation module, and the drive mechanism and the steering mechanism are responsive to commands from the vehicle controller. The camera is configured to capture an input image of a warehouse ceiling comprising elongated skylights, isolated ceiling lights, and/or active optical targets. The navigation module is configured to distinguish between the ceiling lights and the skylights and send commands to the vehicle controller for localization, or to navigate the industrial vehicle through the warehouse based upon valid ceiling light identification, valid skylight identification, valid active target identification, or combinations thereof.

33 Claims, 11 Drawing Sheets

(51) Int. Cl.
*B66F 9/24* (2006.01)
*G06V 10/60* (2022.01)
*G06V 10/22* (2022.01)
*G06V 20/56* (2022.01)

(56) References Cited

U.S. PATENT DOCUMENTS

| | | | |
|---|---|---|---|
| 10,348,983 B2* | 7/2019 | Ogasawara | G06T 7/90 |
| 2016/0063711 A1* | 3/2016 | Ogasawara | G06T 7/536 |
| | | | 348/164 |
| 2016/0090281 A1* | 3/2016 | Bell | G05D 1/0094 |
| | | | 701/28 |
| 2017/0069092 A1* | 3/2017 | Bell | G06T 5/20 |
| 2018/0307941 A1* | 10/2018 | Holz | G01C 21/20 |
| 2019/0265722 A1 | 8/2019 | Haeusler et al. | |

OTHER PUBLICATIONS

Xiaofang Wang: "Graph based approaches for image segmentation and object tracking", Mar. 27, 2015 (Mar. 27, 2015), XP055717392, Retrieved from the Internet: URL:https://tel.archives-ouvertes.fr/tel-01303748/file/TH T2483 xwang.pdf [retrieved on Jul. 22, 2020] p. 5, Section 1.3.3.

* cited by examiner

Scale Index 0 (finest)

Scale Index 6

Scale Index 9 (coarsest)

INDUSTRIAL VEHICLE WITH FEATURE-BASED LOCALIZATION AND NAVIGATION

CROSS-REFERENCE TO RELATED APPLICATIONS

The present disclosure claims the benefit of U.S. Pat. App. Ser. No. 62/842,032, filed on May 2, 2019, and entitled "INDUSTRIAL VEHICLE WITH FEATURE-BASED LOCALIZATION AND NAVIGATION," the entirety of which is incorporated by reference herein.

TECHNICAL FIELD

The present disclosure relates to systems and methods for providing illumination-invariant feature detection and, more specifically, to systems and methods for providing illumination-invariant functions for feature detection.

BACKGROUND

In order to move items about an industrial environment, workers often utilize industrial vehicles, including for example, forklift trucks, hand and motor driven pallet trucks, and/or other materials handling vehicles. The industrial vehicles can be configured as an automated guided vehicle or a manually guided vehicle that navigates through the environment. In order to facilitate automated guidance, or any type of vehicle navigation, the industrial vehicle may be adapted for localization within the environment. That is, the industrial vehicle can be adapted with sensors and processors for localization, i.e., determining the location and, optionally, the pose of the industrial vehicle within the environment. The sensors can be configured to detect objects in the environment and the localization can be dependent upon features extracted from such detected objects. Systems of this nature are described in, for example, US PG Pub. Nos. 2016/0090281 and 2016/0011595.

BRIEF SUMMARY

According to the subject matter of the present disclosure, an industrial vehicle comprises a drive mechanism, a steering mechanism, a vehicle controller, a camera, and a navigation module. The camera is communicatively coupled to the navigation module. The vehicle controller is responsive to commands from the navigation module. The drive mechanism and the steering mechanism are responsive to commands from the vehicle controller. The camera is configured to capture an input image of a ceiling of a warehouse, one or more ceiling lights, one or more active targets, or combinations thereof. The navigation module is configured to identify the one or more skylights, the one or more ceiling lights, the one or more active targets, or combinations thereof, by executing machine readable instructions. The machine readable instructions are to create a Gaussian scale space pyramid from the input image of the ceiling of the warehouse, wherein the Gaussian scale space pyramid comprises a plurality of scale space images, calculate a trace of Hessian response for each image of the plurality of scale space images within the Gaussian scale space pyramid, and build a trace of Hessian response pyramid based on the Gaussian scale space pyramid. The machine readable instructions are further to build a multiscale candidate graph utilizing the trace of Hessian response pyramid, utilize the multiscale candidate graph to identify one or more candidates comprising one or more skylight candidates, one or more ceiling light candidates, one or more active target candidates, or combinations thereof, in the input image of the ceiling, subject the one or more candidates to candidate feature processing to identify as a valid identification of the one or more candidates as the one or more skylights, the one or more ceiling lights, the one or more active targets, or combinations thereof, in the warehouse, and send commands to the vehicle controller to navigate the industrial vehicle through the warehouse based upon the valid identification.

In accordance with an embodiment of the present disclosure, an industrial vehicle comprises a drive mechanism, a steering mechanism, a vehicle controller, a camera, and a navigation module. The camera is communicatively coupled to the navigation module. The vehicle controller is responsive to commands from the navigation module. The drive mechanism and the steering mechanism are responsive to commands from the vehicle controller. The camera is configured to capture an input image of a ceiling of a warehouse comprising one or more skylights, one or more ceiling lights, one or more active targets, or combinations thereof. The navigation module is configured to identify the one or more skylights, the one or more ceiling lights, the one or more active targets, or combinations thereof, by executing machine readable instructions. The machine readable instructions are to create a Gaussian scale space pyramid from the input image of the ceiling of the warehouse, wherein the Gaussian scale space pyramid comprises a plurality of scale space images, calculates a trace of Hessian response for each image of the plurality of scale space images within the Gaussian scale space pyramid, and builds a trace of Hessian response pyramid based on the Gaussian scale space pyramid. The machine readable instructions are further to utilize the trace of Hessian response pyramid to identify one or more candidates comprising one or more skylight candidates, one or more ceiling light candidates, and one or more active target candidates in the input image of the ceiling by generating one or more bounding boxes for each scale space image and thresholding each scale space image in the trace of Hessian response pyramid against a threshold value to utilize each scale space image at or above the threshold value. The machine readable instructions are further to detect one or more light features of varying brightness of the one or more candidates, one or more light features of varying size of the one or more candidates, or combinations thereof, subject to the one or more candidates to candidate feature processing to identify as a valid identification of the one or more candidates as the one or more skylights, the one or more ceiling lights, and the one or more active targets in the warehouse, and send commands to the vehicle controller to navigate the industrial vehicle through the warehouse based upon the valid identification.

In accordance with another embodiment of the present disclosure, a method for navigating an industrial vehicle comprises operating the industrial vehicle in a warehouse, the industrial vehicle comprising a drive mechanism, a steering mechanism, a vehicle controller, a camera, and a navigation module. The camera is communicatively coupled to the navigation module. The vehicle controller is responsive to commands from the navigation module. The drive mechanism and the steering mechanism are responsive to commands from the vehicle controller. The method comprises capturing an input image of a ceiling of a warehouse, one or more ceiling lights, one or more active targets, or combinations thereof by the camera, creating a Gaussian scale space pyramid from the input image of the ceiling of the warehouse utilizing the navigation module, wherein the Gaussian scale space pyramid comprises a plurality of scale space images, calculating a trace of Hessian response for each image of the plurality of scale space images within the Gaussian scale space pyramid, and building a trace of Hessian response pyramid based on the Gaussian scale space pyramid. The method further comprises building a multiscale candidate graph utilizing the trace of Hessian response pyramid, utilizing the multiscale candidate graph to identify one or more candidates comprising one or more skylight candidates, one or more ceiling light candidates, one or more active target candidates, or combinations thereof, in the input image of the ceiling using the navigation module, subjecting the one or more candidates to candidate feature processing to identify as a valid identification of the one or more candidates as the one or more skylights, the one or more ceiling lights, the one or more active targets, or combinations thereof, in the warehouse using the navigation module, and sending commands from the navigation module to the vehicle controller to navigate the industrial vehicle through the warehouse based upon the valid identification.

In accordance with one embodiment of the present disclosure, an industrial vehicle is provided comprising a drive mechanism, a steering mechanism, a vehicle controller, a camera, and a navigation module. The camera is communicatively coupled to the navigation module, the vehicle controller is responsive to commands from the navigation module, and the drive mechanism and the steering mechanism are responsive to commands from the vehicle controller. The camera is configured to capture an input image of a warehouse ceiling comprising elongated skylights characterized by different rates of image intensity change along longitudinal and transverse axial directions, and ceiling lights characterized by a rate of image intensity change. The navigation module is configured to distinguish between the ceiling lights and the skylights and send commands to the vehicle controller to navigate the industrial vehicle through the warehouse based upon valid ceiling light identification, valid skylight identification, or both.

More specifically, it is contemplated that the navigation module may execute machine readable instructions to create a Gaussian scale space pyramid from the input image of the warehouse ceiling, wherein the Gaussian scale space pyramid comprises a plurality of scale space images. The module calculates a trace of Hessian response for each image within the Gaussian scale space pyramid and builds a trace of Hessian response pyramid of the same size and structure as the Gaussian scale space pyramid. The module utilizes the trace of Hessian response pyramid to identify isolated ceiling light candidates and skylight candidates in the input image of the warehouse ceiling. The isolated ceiling light candidates and the skylight candidates are subjected to candidate feature processing to identify valid ceiling lights or skylights in the warehouse.

It is contemplated that the Gaussian scale space pyramid can be created by running a cascading series of image smoothing operations applied to the input image of the warehouse ceiling and can be approximated by convolution with binomial filter kernels. It is also contemplated that the Gaussian scale space pyramid can be created by supplementing the cascading series of image smoothing operations with subsampling operations. The supplemental subsampling operations can be implemented conditionally as a function of available navigation module computing power.

The trace of Hessian response can be calculated based on each scale space image being convolved with second-order partial derivative filter kernels.

In accordance with another embodiment of the present disclosure, the navigation module is configured to distinguish between the ceiling lights and the skylights and send commands to the vehicle controller to localize the industrial vehicle through the warehouse based upon valid ceiling light identification, valid skylight identification, or both.

BRIEF DESCRIPTION OF THE SEVERAL VIEWS OF THE DRAWINGS

The following detailed description of specific embodiments of the present disclosure can be best understood when read in conjunction with the following drawings, where like structure is indicated with like reference numerals and in which.

DETAILED DESCRIPTION

The embodiments described herein generally relate to Environmental Based Localization techniques (EBL) for extracting features from overhead lighting including, but not limited to, skylights. The EBL may be used to localize and/or navigate an industrial vehicle through a building structure, such as a warehouse. Suitably, the overhead lighting may be mounted in or on a ceiling of a building. However, in some embodiments the lighting may also or alternatively be suspended from a ceiling or wall via suitable structure. In some embodiments, a camera can be mounted to an industrial vehicle (e.g., automated guided vehicle or a manually guided vehicle) that navigates through a warehouse. The input image can be any image captured from the camera prior to extracting features from the image.

Figure 1:
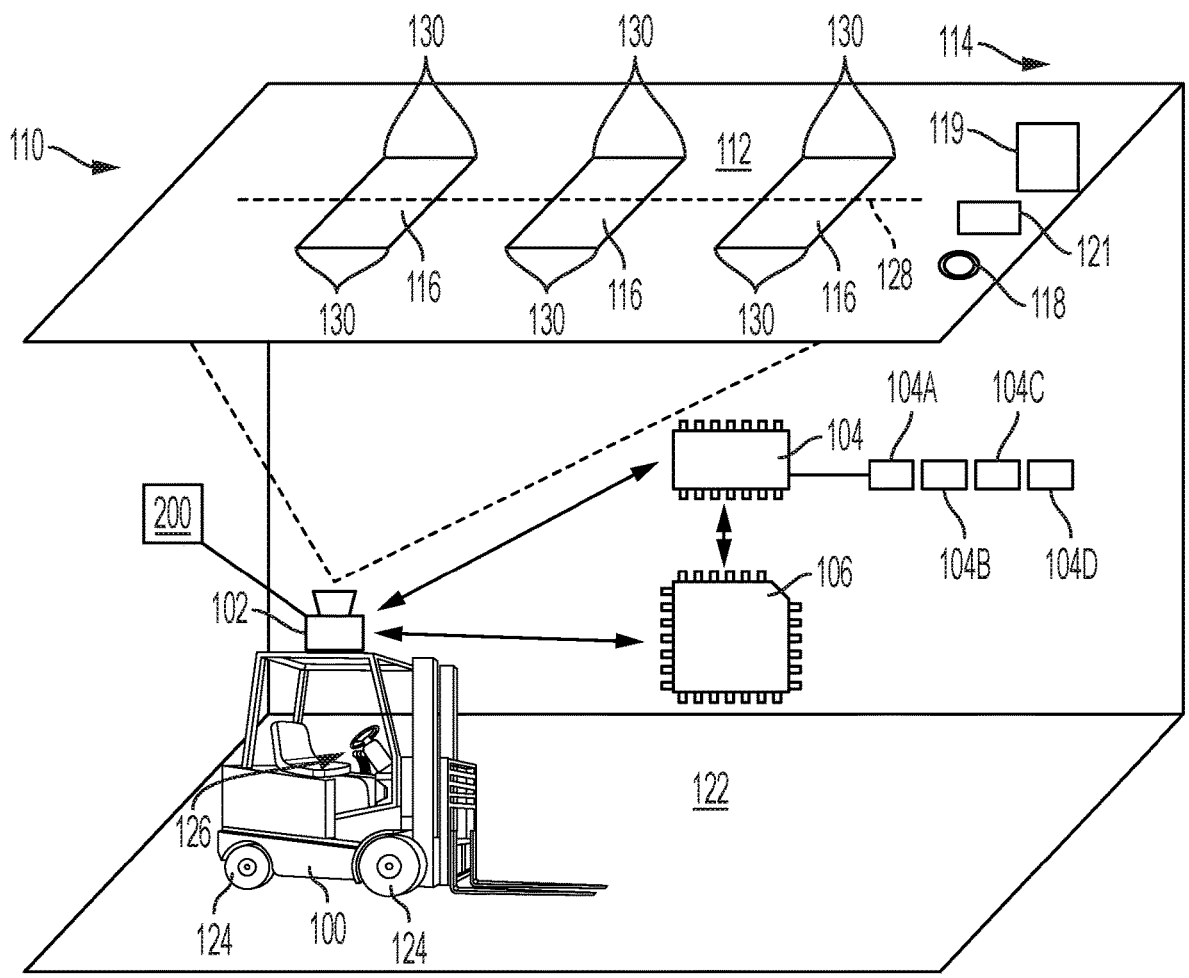
FIG. 1 depicts a vehicle for environmental based localization according to one or more embodiments shown and described herein.

Referring initially to FIG. 1, an industrial vehicle 100 can be configured to navigate through a warehouse 110. The industrial vehicle 100 can comprise an industrial vehicle for lifting and moving a payload such as, for example, a forklift truck, a reach truck, a turret truck, a walkie stacker truck, a tow tractor, a pallet truck, a high/low, a stacker-truck, trailer loader, a sideloader, a fork hoist, or the like. The industrial vehicle 100 can be configured to automatically or manually navigate an inventory transit surface 122 of the warehouse 110 along a desired path. Accordingly, the industrial vehicle 100 can be directed forwards and backwards by rotation of one or more wheels 124. Additionally, the industrial vehicle 100 can be caused to change direction by steering the one or more wheels 124. Optionally, the industrial vehicle 100 can comprise operator controls 126 for controlling functions of the vehicle such as, but not limited to, the speed of the wheels 124, the orientation of the wheels 124, or the like. The operator controls 126 can comprise controls that are assigned to functions of the industrial vehicle 100 such as, for example, switches, buttons, levers, handles, pedals, input/output device, or the like. It is noted that the term "navigate" as used herein can mean controlling the movement of a vehicle from one place to another.

The industrial vehicle 100 can comprise a drive mechanism 104A, a steering mechanism 104B, a vehicle controller 104C, and a navigation module 104D. The vehicle controller is responsive to commands from the navigation module. The drive mechanism and the steering mechanism are responsive to commands from the vehicle controller.

The industrial vehicle 100 can further comprise a camera 102 communicatively coupled to the navigation module 104D for capturing overhead images. The camera 102 may be configured to capture an input image 200 of a ceiling 112 of the warehouse 110 comprising one or more skylights 116, one or more ceiling lights 114, 118, 119, one or more active targets, 121, or combinations thereof. The camera 102 can be any device capable of capturing the visual appearance of an object and transforming the visual appearance into an image. Accordingly, the camera 102 can comprise an image sensor such as, for example, a charge coupled device, complementary metal-oxide-semiconductor sensor, or functional equivalents thereof. In some embodiments, the industrial vehicle 100 can be located within the warehouse 110 and be configured to capture overhead images of the ceiling 112 of the warehouse 110. In order to capture overhead images, the camera 102 can be mounted to the industrial vehicle 100 and focused to the ceiling 112. For the purpose of defining and describing the present disclosure, the term "image" as used herein can mean a representation of the appearance of a detected object. The image can be provided in a variety of machine readable representations such as, for example, JPEG, JPEG 2000, Exif, TIFF, raw image formats, GIF, BMP, PNG, Netpbm format, WEBP, raster formats, vector formats, or any other format suitable for capturing overhead objects.

The ceiling 112 of the warehouse 110 can comprise overhead lights such as, but not limited to, ceiling lights 114 and/or skylights 116 for providing illumination from the ceiling 112 or generally from above a vehicle operating in the warehouse. The skylights 116 may be, for example, rectangular lights. The ceiling lights 114 can comprise substantially rectangular lights such as, for example, rectangular lights 119 that may be fluorescent lights or other lights, or the like, and/or optical active targets 121, such as those including one or more LEDs on a strip, as disclosed in U.S. patent application Ser. No. 16/280,736, entitled "SYSTEMS AND METHODS FOR OPTICAL TARGET BASED INDOOR VEHICLE NAVIGATION," filed Feb. 2, 2019, assigned to Crown Equipment Limited; and may be mounted in or suspended from the ceiling or wall structures so as to provide illumination from above. As used herein, the term "skylight" can mean an aperture in a ceiling or roof fitted with a substantially light transmissive medium for admitting daylight, such as, for example, air, glass, plastic or the like. While skylights can come in a variety of shapes and sizes, the skylights described herein can include rectangular skylights that may or may not be split by girders or crossbars into a series of panels. Alternatively, skylights can comprise smaller, discrete skylights of rectangular or circular shape. Alternatively or additionally, the ceiling lights 114 can comprise substantially circular lights such as, for example, round lights 118, or the like. Thus, overhead lights or "ceiling lights" include sources of natural (e.g. sunlight) and artificial (e.g. electrically powered) light. In some embodiments, the ceiling lights are circularly symmetric round lights and the skylights are substantially elongated. In geometry, circular symmetry is a type of continuous symmetry for a planar object that can be rotated by any arbitrary angle and map onto itself.

In embodiments, the one or more ceiling lights 114 may comprise one or more rectangular ceiling lights 119, one or more circular ceiling lights 118 characterized by a symmetric rate of image intensity change, or combinations thereof. The one or more ceiling lights 114 may be characterized by a symmetric rate of image intensity change or by different rates of image intensity change along longitudinal and transverse axial directions. The one or more skylights 116 may be characterized by different rates of image intensity change along longitudinal and transverse axial directions. The one or more active targets 121 may comprise one or more optical light emitting diode (LED) features, each LED feature characterized by a symmetric rate of intensity change. The navigation module 104D may be configured to identify the valid identification of the one or more candidates as the one or more skylights, the one or more ceiling lights, and the one or more active targets. The navigation module 104D may further be configured to (i) identify the one or more skylights based on a recognition of different rates of image intensity change along longitudinal and transverse axial directions in the input image, (ii) identify the one or more ceiling lights based on a recognition of a symmetric rate of image intensity change or by different rates of image intensity change along longitudinal and transverse axial directions in the input image, and (iii) identify the one or more active targets based on a recognition of a plurality of symmetric rates of intensity change within a threshold distance in the input image.

The embodiments described herein can comprise one or more processors 104 communicatively coupled to the camera 102. The one or more processors 104 can execute machine readable instructions to implement any of the methods or functions described herein automatically. Memory 106 for storing machine readable instructions can be communicatively coupled to the one or more processors 104, the camera 102, or any combination thereof. The one or more processors 104 can comprise a processor, an integrated circuit, a microchip, a computer, or any other computing device capable of executing machine readable instructions or that has been configured to execute functions in a manner analogous to machine readable instructions. The memory 106 can comprise RAM, ROM, a flash memory, a hard drive, or any non-transitory device capable of storing machine readable instructions.

The one or more processors 104 and the memory 106 may be integral with the camera 102. Alternatively or additionally, each of the one or more processors 104 and the memory 106 can be integral with the industrial vehicle 100. Moreover, each of the one or more processors 104 and the memory 106 can be separated from the industrial vehicle 100 and the camera 102. For example, a server or a mobile computing device can comprise the one or more processors 104, the memory 106, or both. It is noted that the one or more processors 104, the memory 106, and the camera 102 may be discrete components communicatively coupled with one another without departing from the scope of the present disclosure. Accordingly, in some embodiments, components of the one or more processors 104, components of the memory 106, and components of the camera 102 can be physically separated from one another. The phrase "communicatively coupled," as used herein, means that components are capable of exchanging data signals with one another such as, for example, electrical signals via conductive medium, electromagnetic signals via air, optical signals via optical waveguides, or the like.

Thus, embodiments of the present disclosure may comprise logic or an algorithm written in any programming language of any generation (e.g., 1GL, 2GL, 3GL, 4GL, or 5GL). The logic or an algorithm can be written as machine language that may be directly executed by the processor, or assembly language, object-oriented programming (OOP), scripting languages, microcode, etc., that may be compiled or assembled into machine readable instructions and stored on a machine readable medium. Alternatively or additionally, the logic or algorithm may be written in a hardware description language (HDL). Further, the logic or algorithm can be implemented via either a field-programmable gate array (FPGA) configuration or an application-specific integrated circuit (ASIC), or their equivalents.

As is noted above, the industrial vehicle 100 can comprise or be communicatively coupled with the one or more processors 104. Accordingly, the one or more processors 104 can execute machine readable instructions to operate or replace the function of the operator controls 126. The machine readable instructions can be stored upon the memory 106. Accordingly, in some embodiments, the industrial vehicle 100 can be navigated automatically by the one or more processors 104 executing the machine readable instructions. In some embodiments, the location of the vehicle can be monitored by the EBL as the industrial vehicle 100 is navigated, whether manually or automatically.

For example, the industrial vehicle 100 can automatically navigate along the inventory transit surface 122 of the warehouse 110 along a desired path to a desired position within the warehouse environment based upon a localized position of the industrial vehicle 100. In some embodiments, the industrial vehicle 100 can determine the localized position of the industrial vehicle 100 with respect to the warehouse 110. For the purposes of defining and describing the concepts and scope of the present disclosure, it is noted that a "warehouse" encompasses any indoor or otherwise covered facility in which materials handling vehicles transport goods including, but not limited to, warehouses intended primarily for the storage of goods, such as those where single or multi-level warehouse racks or storage units are arranged in aisles or otherwise, and manufacturing facilities where goods are transported about the facility by materials handling vehicles for use in one or more manufacturing processes. The determination of the localized position of the industrial vehicle 100 can be performed by comparing image data to map data. The map data can be stored locally in the memory 106, which can be updated periodically, or map data provided by a server or the like. Given the localized position and the desired position, a travel path can be determined for the industrial vehicle 100. Once the travel path is known, the industrial vehicle 100 can travel along the travel path to navigate the inventory transit surface 122 of the warehouse 110. Specifically, the one or more processors 104 can execute machine readable instructions to perform EBL functions and operate the industrial vehicle 100. In one embodiment, the one or more processors 104 can adjust the steering of the wheels 124 and control the throttle to cause the industrial vehicle 100 to navigate the inventory transit surface 122.

The navigation module 104D may be configured to identify the one or more skylights 116, the one or more ceiling lights 114, 118, 119, the one or more active targets 121, or combinations thereof, by executing machine readable instructions, as described in greater detail below. In embodiments, the machine readable instructions are to create a Gaussian scale space pyramid 404 from the input image of the ceiling of the warehouse, wherein the Gaussian scale space pyramid comprises a plurality of scale space images. Further, such as through execution of such instructions by the navigation module 104D, a trace of Hessian response 406 is calculated for each scale space image of the plurality of scale space images within the Gaussian scale space pyramid. As understood to a skilled artisan and contemplated within the scope of this disclosure, a trace of Hessian response is also referable to as a Laplacian of the Gaussian. A trace of Hessian response pyramid 417 is built based on the Gaussian scale space pyramid. A multiscale candidate graph 408 is built utilizing the trace of Hessian response pyramid is utilized to identify one or more candidates comprising one or more skylight candidates 116, one or more ceiling light candidates 114, 118, 119, one or more active target candidates 121, or combinations thereof, in the input image 200 of the ceiling 112. The one or more candidates are subjected to candidate feature processing to identify a valid identification of the one or more candidates as the one or more skylights 116, the one or more ceiling lights 114, 118, 119, the one or more active targets 121, or combinations thereof, in the warehouse 110. Commands are send from the navigation module 104D to the vehicle controller 104C to navigate the industrial vehicle 100 through the warehouse 110 based upon the valid identification.

Figure 2:
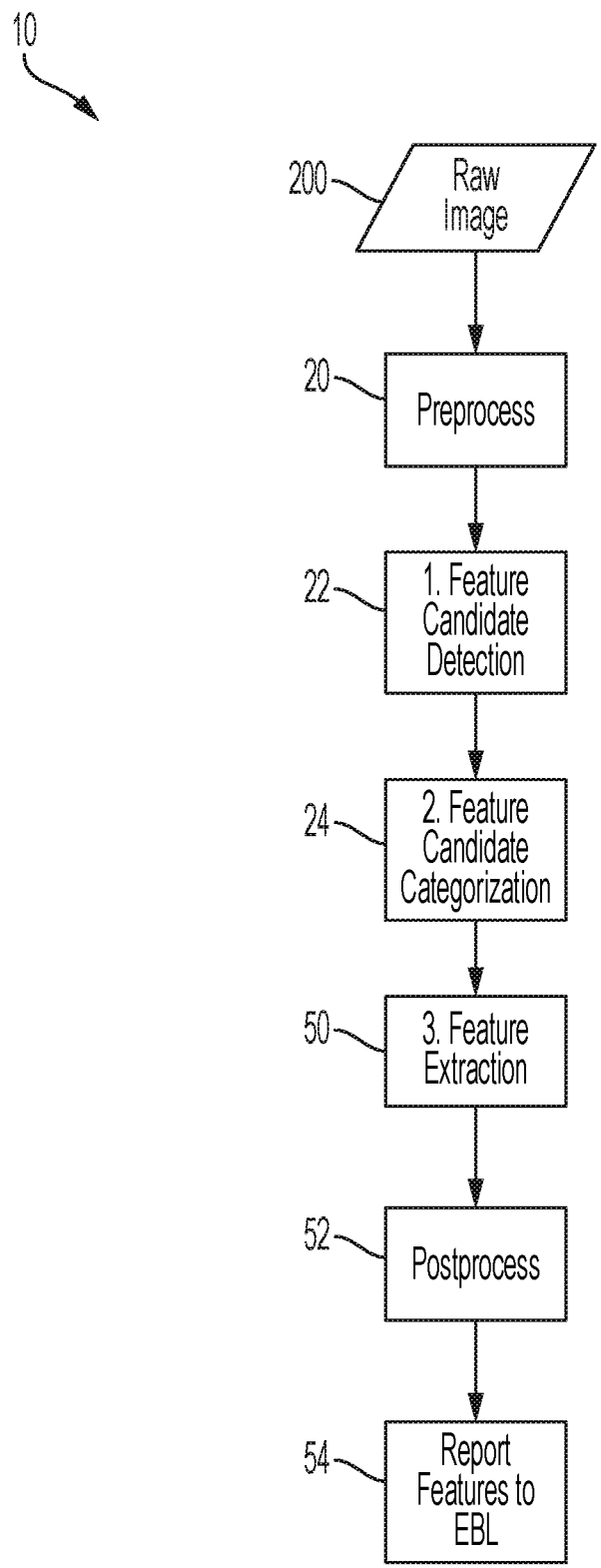
FIG. 2 depicts a flowchart of an exemplary algorithm for camera feature extraction/overhead lighting feature extraction for environmental based localization according to one or more embodiments shown and described herein.
Figure 3:
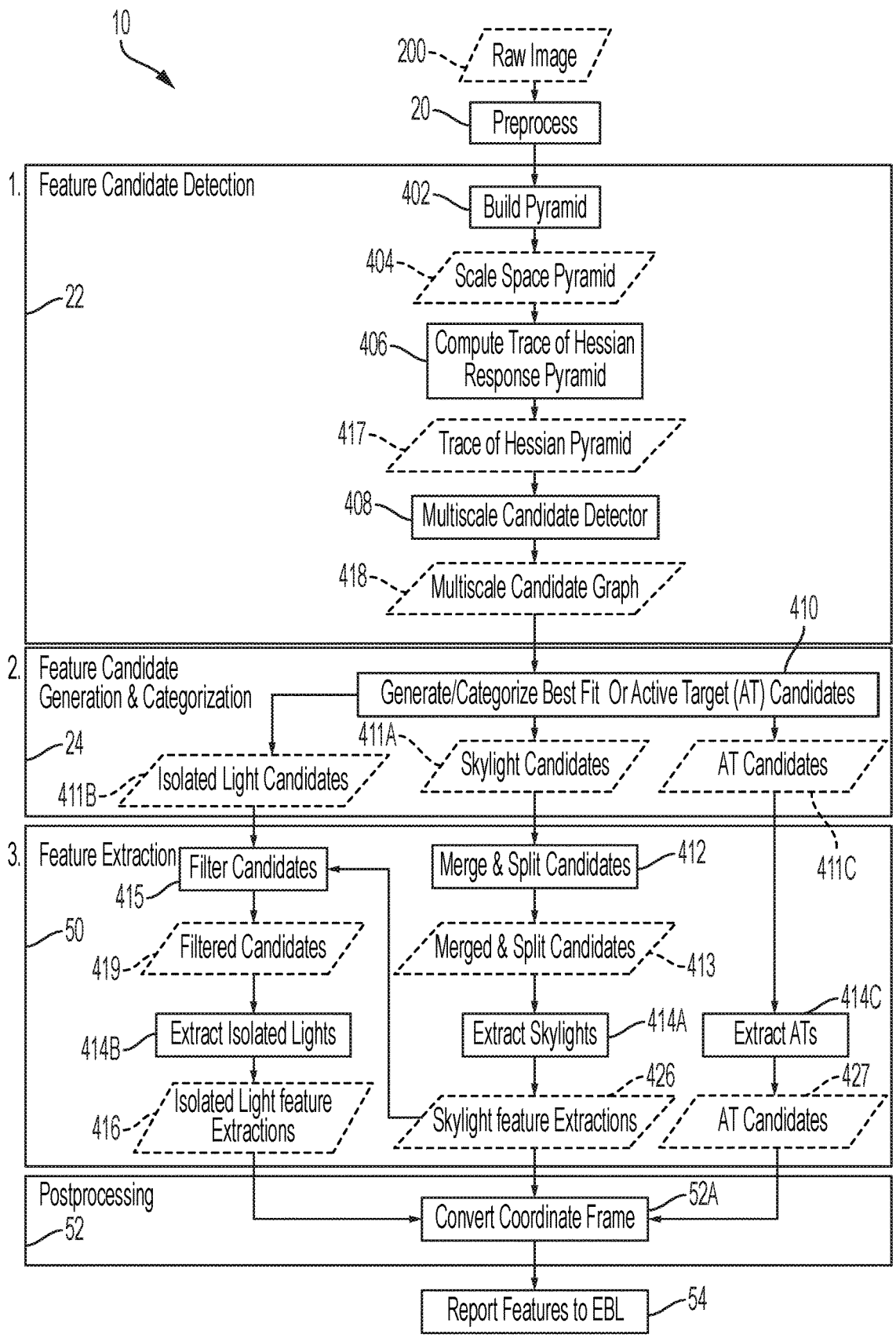
FIG. 3 depicts the flowchart of FIG. 2 in expanded detail of a feature candidate detection function, a feature candidate generation and categorization function, a feature extraction function, and a postprocessing function.

Referring to FIGS. 2-3, a flow chart of a sequence of functions for a full Camera Feature Extraction (CFE) algorithm 10 is schematically depicted. It is noted that, while the functions are enumerated and depicted as being performed in a particular sequence in the depicted embodiment, the functions can be performed in an alternative order without departing from the scope of the present disclosure. It is furthermore noted that one or more of the functions can be omitted without departing from the scope of the embodiments described herein.

Now with regard to FIGS. 2-11, and referring collectively to FIGS. 2-3, the CFE algorithm 10 is configured to detect various isolated lights (e.g., round or rectangular, whether powered or unpowered) and long-continuous strip skylights as described above. The CFE algorithm 10 can further comprise a feature candidate detection function 22 for detecting low-level features from an input image 200 of the ceiling 112, which image may undergo a preprocess function 20 as described further below. Referring collectively to FIGS. 2-3, the feature candidate detection function 22 can comprise an illumination-invariant process for low-level feature detection. For example, candidate features can be extracted from the skylights 116 and/or round lights 118 (and/or rectangular lights 119 of FIG. 1). The illumination-invariant process can enable the EBL to perform robustly for sites in which illumination levels are variable and/or include an at least partially obstructed line of sight illumination to affect luminosity, including but not limited to skylight-heavy sites in which illumination levels are highly variable, sites including a high level of racking with product placement that may occlude isolated lights and/or skylights, and/or sites including skylights having a high level of illumination. Accordingly, instead of relying on a bi-modal system, the illumination-invariant process can detect skylight candidates 411A and isolated light candidates 411B on multiscales as local maxima in multiscale image space.

A multiscale candidate detector function at block 408 of the feature candidate detection function 22 utilizes a trace input 417 to generate a multiscale candidate graph 418 to be input into a block 410 to generate and categorize best fit or active target candidates from both the various isolated lights and skylights in the feature candidate generation and categorization function 24. Results from the block 410 may be generated skylight candidates 411A and isolated light candidates 411B and active target candidates 411C, which are input into a feature extraction function 50. The navigation module 104D may be configured to execute machine readable instructions to generate one or more best fit candidates from the one or more candidates, input the one or more best fit candidates into a feature extraction function of the candidate feature processing to generate one or more candidate feature extractions, and utilize the one or more candidate feature extractions from the feature extraction function to identify the valid identification of the one or more candidates as the one or more skylights 116, the one or more ceiling lights 114, the one or more active targets 121, or combinations thereof. The one or more best fit candidates may be categorized as the one or more candidates 411 comprising the one or more skylight candidates 411A, the one or more ceiling light candidates 411B, the one or more active target candidates 411C, or combinations thereof.

The navigation module 104D may be configured to execute machine readable instructions to apply a merge and split candidates function to merge and split one or more bounding boxes associated with the one or more skylight candidates to generate one or more split bounding boxes when the one or more best fit candidates are categorized as the one or more skylight candidates, and extract one or more features from the one or more split bounding boxes to generate the one or more candidate feature extractions. A merge and split candidates function may be applied in block 412 to the skylight candidates 411A such that merged and split candidates 413 are input into block 414 to extract skylights as skylight feature extractions 426. The isolated light candidates 411B and/or the skylight feature extractions 426 may be passed in as an immutable reference in block 415 to generate filtered candidates 419 input into block 414B to extract isolated lights and generate isolated light feature extractions 416. The navigation module 104D may be configured to execute machine readable instructions to filter the one or more best fit candidates to generate the one or more candidate feature extractions. The instructions may be to filter the one or more best fit candidates when the one or more best fit candidates are categorized as the one or more ceiling light candidates, generate one or more isolated light feature extractions from the one or more ceiling light candidates comprising one or more isolated light candidates, generate one or more skylight feature extractions from the one or more skylight candidates, and remove the one or more isolated light candidates comprising the one or more isolated light feature extraction that intersect with the one or more skylight feature extractions. In embodiments, any isolated light candidates 411B that intersect with a skylight extraction containing skylight point fixes may be removed to reduce chances of reporting an isolated light extraction that is actually from a skylight. If the detected skylight has point fixes, the CFE algorithm 10 has enough features to filter out the isolated light candidates 411B without affecting the localization system. As a non-limiting example, corners 130 (FIG. 1) are representative of point fixes that may be extracted from lights with corners such as rectangular lights, either powered such as isolated lights and/or optical targets or unpowered such as skylights. The isolated light feature extractions 416 and the skylight feature extractions 426 may be used as input for a postprocessing function 52 in block 52A and converted from feature coordinates from an image processing frame back to a raw image frame. In block 54, the features as converted may be reported to the EBL system.

The preprocess function 20 of the CFE algorithm 10 can comprise functions for removing distortion effects from the raw image and shift to image processing frame prior to main processing steps of the algorithm, as described in U.S. Pat. No. 9,880,009 to Crown Equipment Corp., entitled INDUSTRIAL VEHICLE WITH FEATURE-BASED LOCALIZATION AND NAVIGATION, issued on Jan. 30, 2018, which is incorporated by reference in its entirety herein. The preprocess function 20 may be configured to process the input image 200 of the ceiling 112 prior to executing further functions on the input image 200. The input image 200 may be processed according to one or more extraction algorithms as described herein and as set forth in U.S. Pat. No. 9,880,009 to Crown Equipment Corp.

The feature candidate detection function 22 may be configured to detect low-level multiscale feature candidates from an input image. The feature candidates from multiple scales may be in the form of oriented bounding boxes (rotated rectangles). Each candidate may contain part of ceiling light features. The low-level candidates may be associated into graph structure across multiple scales in block 408 to generate multiscale candidate graph 418.

A feature candidate generation and categorization function 24 may be configured to generate final candidates for ceiling light features from low-level multiscale feature candidates, and categorize which type of feature, if any, each candidate most likely represents. The final candidates may be in the form of oriented bounding boxes (rotated rectangles), which contains a ceiling light feature that is either a substantially circular light or a substantially rectangular light, or it may be a long, continuous skylight. In embodiments, not all candidates from different scales are used to generate those categorized candidates.

The feature extraction function 50 is configured to extract ceiling light features, e.g. centroid and corners from the categorized candidates. Specifically, feature candidates categorized as isolated lights, such as substantially circular or substantially rectangular lights, may have a centroid extraction function applied. Additionally or alternatively, corners 130 as point fixes can be extracted from feature candidates categorized to longer or larger substantially rectangular lights, such as a series of panels separated by roofing structure. As a non-limiting example, the series of panels may include long skylights, rectangular fluorescent light panels, and strip lights aligned in a strip along a common longitudinal axis, whether strip fluorescent lights and/or strip skylights. Merge and split processes in block 412 are introduced to prepare skylight candidates 411A before feature extraction. Isolated light candidates 411B are filtered in block 415 according to skylight feature extractions 426 if skylights present.

Finally, before the extracted features are reported to a main EBL algorithm in block 54, they may be passed through the postprocessing function 52. The postprocessing function 52 may be comprised of functions that convert feature coordinates from the image processing frame back to raw image frame, i.e. the EBL frame.

Figure 4:
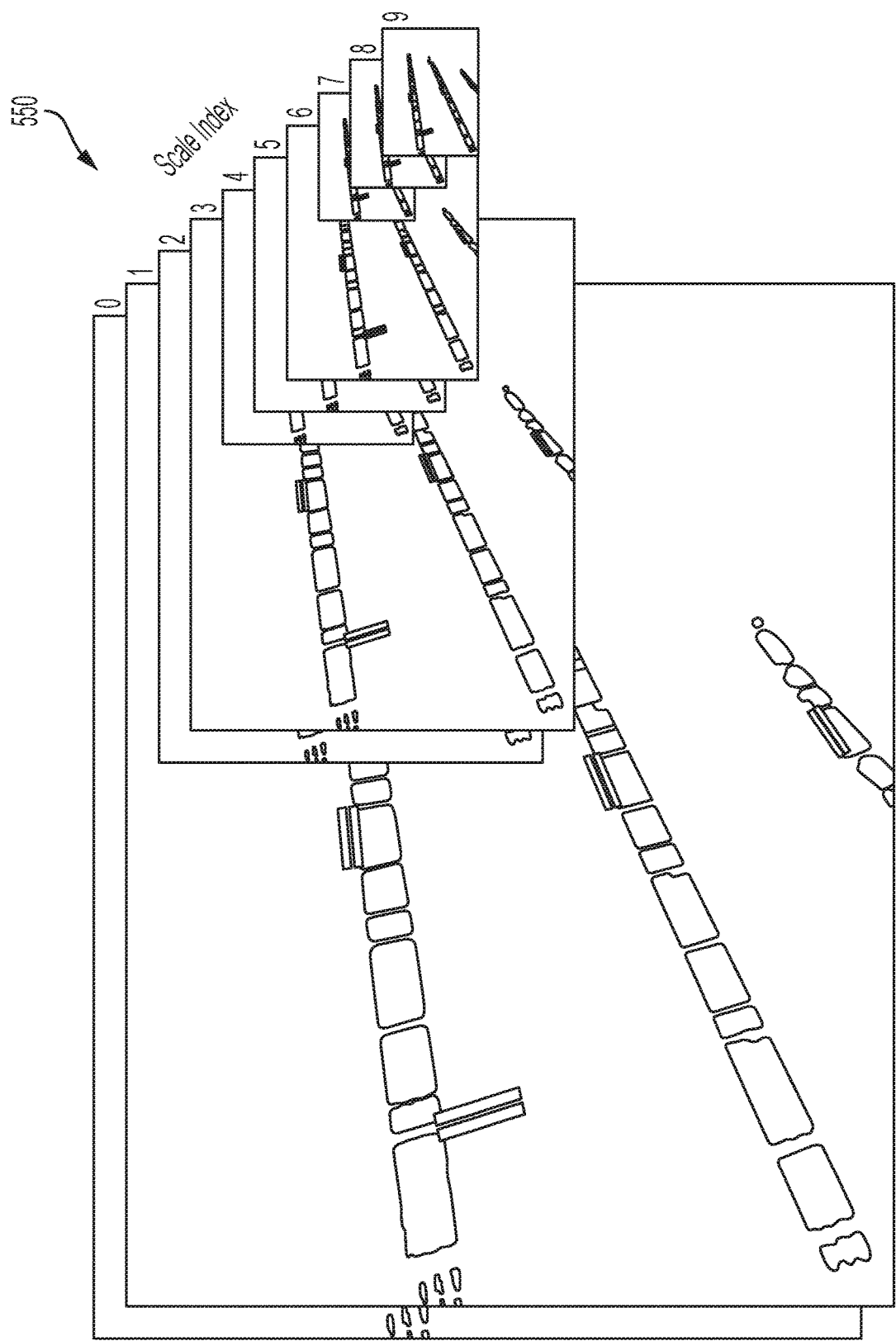
FIG. 4 schematically depicts, in association with the feature candidate detection function of FIG. 3, a scale space pyramid of an image including rectangular ceiling lights and skylights according to one or more embodiments shown and described herein.

Referring collectively to FIGS. 2-4, the feature candidate detection function 22 may comprise a build pyramid function in block 402. In embodiments, the build pyramid function is configured to run a cascading series of image smoothing and subsampling operations to create a Gaussian scale space pyramid, which in some embodiments may be an approximate Gaussian space pyramid, as described in U.S. Pat. No. 9,880,009 to Crown Equipment Corp., which is incorporated by reference in its entirety above.

Scale space pyramids may be comprised of a configurable number of scale levels and images. The number of scale level images may be tuned to suit the scale of the largest light features present in the warehouse. For example, the build pyramid function may be configured to produce a scale space pyramid with more levels for a warehouse containing skylights than a warehouse that does not contain skylights.

FIG. 4 shows an example scale space pyramid 550 of an image containing some substantially rectangular ceiling lights and some skylights. This example scale space pyramid 550 is comprised in total of ten scale space images from Scale Index 0 to Scale Index 9 as image levels respectively representing Scale Indexes 0-9 in the scale space pyramid 550 as shown in FIG. 4 and arranged with two images at full image size (e.g., Scale Indexes 0 and 1), two images at half the full image size (e.g., Scale Indexes 2 and 3), and three images each in the next two sub sampled image sizes (e.g., respectively, Scale Indexes 4-6 and 7-9). The higher the scale index, the more smoothed the image is, and the coarser, or lower frequency, the feature candidates that may be detected.

In embodiments, for the CFE algorithm 10, it is not necessary to have the same number of scale images in each of the scale image size levels in the pyramid. The number of scale image size levels and scale images in total could differ from that shown in FIG. 4 without departing from the scope of CFE algorithm 10 and still allow the CFE algorithm 10 to produce a set of features suitable for localization with EBL.

The scale space pyramid 550 produced by the build pyramid function in block 402 may be passed on as input 404 to a compute trace of Hessian response pyramid function of block 406. The compute trace of Hessian response pyramid function, as described in U.S. Pat. No. 9,880,009 to Crown Equipment Corp., which is incorporated by reference in its entirety above, is configured to apply differential filtering, specifically computing the trace of Hessian response for each image, to produce a trace of Hessian pyramid 417. In embodiments, the trace of Hessian pyramid is identical in size in structure to the scale space pyramid 550 input. Specifically, for the example scale space pyramid 550 of FIG. 4, the resultant trace of Hessian pyramid 417 of FIG. 3 also contains a total of ten scale images arranged in scale image levels from largest to smallest in groups of two images (e.g., Scale Indexes 0-1), two images (e.g., Scale Indexes 2-3), three images (e.g., Scale Indexes 4-6), and three images (e.g., Scale Indexes 7-9) respectively.

The differential trace of Hessian filtering may be configured to respond to image features that are of higher intensity than their immediate local neighborhood in image space. It is equally suitable for identifying circularly symmetric features such as substantially round lights 118 or more elongated features such as skylights 116 or substantially rectangular lights 119.

Figure 5:
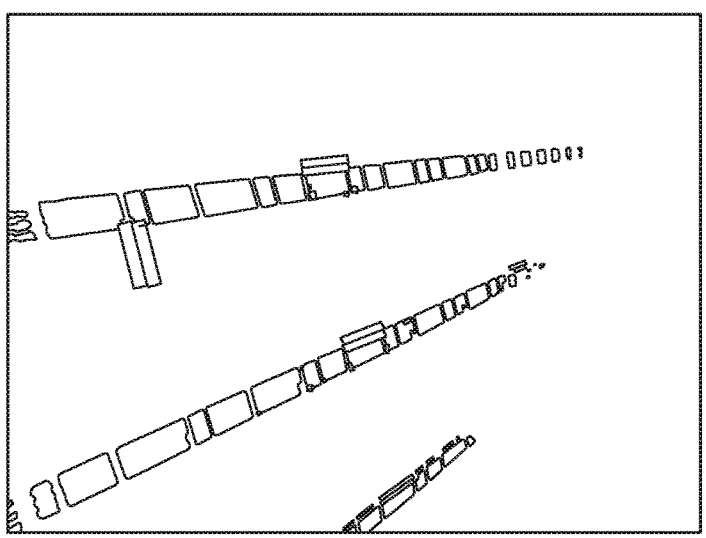
FIG. 5 schematically depicts rotated rectangle feature candidates detected at three of the scale levels of the scale space pyramid of FIG. 4 according to one or more embodiments shown and described herein.
Figure 5:
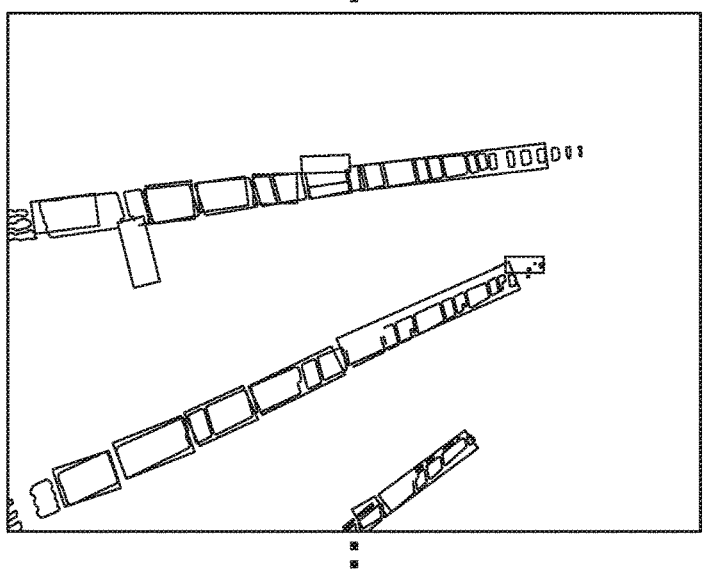
Figure 5:
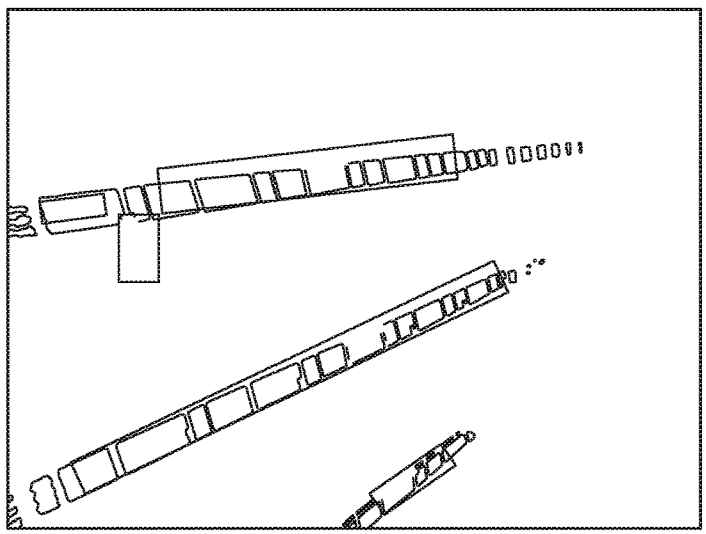

Referring collectively to FIGS. 3-5, the feature candidate detection function 22 may comprise a multiscale candidate detector function in block 408 that, in one embodiment, takes as input the trace of Hessian pyramid 417 produced by the compute trace of Hessian response pyramid function of block 406 and generate low-level multiscale feature candidates in the form of rotated rectangle bounding boxes in a multiscale candidate graph 418 to be passed on to the feature candidate generation and categorization function 24.

In one embodiment, the multiscale candidate detector of block 408 may detect feature candidates by thresholding each scale image in the trace of Hessian pyramid 417 and performing image processing functions to locate structures of interest. For the EBL application of locating ceiling light features, the trace response of images in the trace of Hessian pyramid 417 may be negated as bright objects on a dark background produce a strong negative response in trace of Hessian response space. The threshold applied to the trace response images may be the same fixed threshold value for every scale image in the trace of Hessian pyramids 417, or in other embodiments may be different for every scale level image size or every scale image without departing from the scope of this function. Each scale space image at or above the threshold value may be utilized.

The navigation module 104D may be configured to execute machine readable instructions to build the multiscale candidate graph 418 based on each scale space image in the trace of Hessian response pyramid 417. The plurality of scale space images may comprise a range from a low value fine scale index to a high value coarse scale index having a value higher than the low value fine scale index. The multiscale candidate graph 418 may be built by beginning from the high value coarse index to process each scale space image down to the low value fine scale index to build up inter-image graph edge connections between one or more graph nodes from each scale space image. The one or more graph nodes may be associated with one or more bounding boxes in each scale space image. The multiscale candidate graph 418 may be utilized to identify the one or more candidates by generating one or more bounding boxes for each scale space image and thresholding each scale space image in the trace of Hessian response pyramid 417 against a threshold value.

The thresholded trace of Hessian pyramid images are binary images upon which structures of interest may be detected through connected component extraction and processing or, additionally or alternatively, contour extraction and processing. With respect to subsequent processing steps in the CFE algorithm 10, the connected components or contours representing structures of interest may be approximated in a single type of representation, such as a bounding box. In one embodiment this could be a rotated rectangle (oriented bounding box), in others it may be an axis-aligned bounding box. A bounding box fitting function can be applied to every thresholded image from the trace of Hessian 417 to produce collection bounding boxes respectively for each scale image in the pyramid.

In one embodiment, filtering could be applied at this stage to remove bounding boxes that are highly probable to correspond to noisy detections from the thresholding stage. For example, tiny rotated rectangle bounding boxes below a certain size threshold may be discarded as too small to contain a ceiling light feature suitable for localization purposes.

The bounding boxes detected from smaller scale levels—that is, scale images in the pyramid which have been downsampled to, for the example pyramid 550 depicted in FIG. 4, one-half, one-quarter or one-eighth the size of the original image—may be scaled up accordingly to the coordinate frame of the full-size image. This allows all feature candidates detected across the whole trace of Hessian pyramid 417 to be handled in the same coordinate space.

FIG. 5 shows an example of rotated rectangle feature candidates 552 detected at three of the scale images from the scale space depicted in FIG. 4 (e.g. Scale Indexes 0, 6, and 9, with Scale Index 0 being the finest and Scale Index 9 being the coarsest) and surrounded by bounding boxes 553. For simplicity of description, the detections from the other scale images have not been shown but may be incorporated into the systems and functions described herein as well.

Referring to FIG. 5, at Scale Index 9 directed to the most smoothed image in the pyramid 550, the detected bounding boxes 553 correspond to coarser structures, like large rectangular lights 119 and whole skylights 116.

At a more intermediate level in the pyramid 550 (e.g., at Scale Index 6), the resultant bounding boxes 553 start fitting to a slightly finer level of detail, such as individual skylight panels. In some cases, ceiling lights 114 that overlap skylights 116 will now be detected in their own box, separated from the skylight 116.

At the finest scale image (e.g., at Scale Index 0), the base of the pyramid 550, the trace of Hessian responds to finer, high-frequency detail. In an embodiment and as shown in the Scale Index 0 image of FIG. 5, individual fluorescent tubes of the rectangular lights have been segmented into separate bounding boxes 553. At the finer scales, there may be some noisy detections, for example around the corners and edges of features like skylight panels.

Referring to FIGS. 2-6, and the multiscale candidate detector of block 408, a purpose of the differential filtering (i.e. trace of Hessian 417 generated via block 406) and the scale space pyramid approach (e.g., blocks 404 and 406) to candidate feature detection in feature candidate detection function 22 may be twofold: respectively, the detection of light features of varying brightness, and the detection of light features of varying size. The navigation module 104D may be configured to execute machine readable instructions to detect one or more light features of varying brightness of the one or more candidates, detect one or more light features of varying size of the one or more candidates, or combinations thereof with respect to the multiscale candidate graph 418.

As shown in FIG. 5, some light features have good-fitting bounding box detections at certain scales but ill-fitting boxes at others. Ultimately, in embodiments, it is desirable to generate only a single feature candidate bounding box 553 for each light feature in the feature candidate generation and categorization function 24 to pass on to the feature extraction function 50 to extract features suitable for localization such as centroids or point fixes. The navigation module 104D may be configured to execute machine readable instructions to generate a feature candidate bounding box 553 for each of the one or more candidates in the candidate feature processing and extract one or more features from each feature candidate bounding box 553. The navigation module 104D may be configured to execute machine readable instructions to generate feature coordinates of the one or more candidates based on the valid identification. The navigation module 104D may further be configured to send commands to the vehicle controller to navigate the industrial vehicle 100 through the warehouse 110 based upon the valid identification and the feature coordinates.

To assist the feature candidate generation and categorization function 24 and provide more context across the scale and spatial dimensions, at the end of the multiscale candidate detector function of block 408, a graph building algorithm is employed to create a multiscale feature graph structure as multiscale candidate graph 418. In embodiments, the multiscale feature graph as the multiscale candidate graph 418 may be a directed acyclic graph (DAG).

Each bounding box 553 from the entire set across all trace of Hessian pyramid scales may be a node or vertex in the graph 418. The graph building algorithm within block 408 begins from the coarsest scale and works back down the pyramid towards the finest scale to build up edges between these graph vertices.

In one embodiment, the graph building algorithm of the multistate candidate detector of block 408 could proceed as follows. First, start with the set of bounding boxes 553 detected from the coarsest scale in trace of Hessian pyramid 417 and initialize all these boxes as source nodes in the graph. The scales from coarsest to finest, for the set of bounding box detections at each scale may then be iterated. As a non-limiting example, iteration may occur through each bounding box 553 at this scale level, and the box considered at each loop iteration may be called the query box. A determination may be made whether the query box intersects any of the bounding boxes in the immediate "parent" (i.e. coarser) scale level. Here, "intersects" means a two-dimensional intersection check between the two bounding boxes 553 in the same coordinate frame—such as if the two boxes were sourced from the same scale image. A graph edge may be created between the query box and each box in the previous coarser scale with which it intersects. If no intersections are found between the query box and boxes from the immediate coarser neighbor scale, the approach may iteratively check the next coarsest scale in the same way until an intersection has been found or all scales have been checked. If no intersections are found at any coarser level, the query box becomes another source node or vertex in the graph. This step may allow for edges to be made between detections from scale levels that are not immediately adjacent in the trace of Hessian pyramid 417, where, for example, due to detection noise or other reasons, a bounding box 553 may not have been detected at one or more scale levels for the feature in question.

Figure 6:
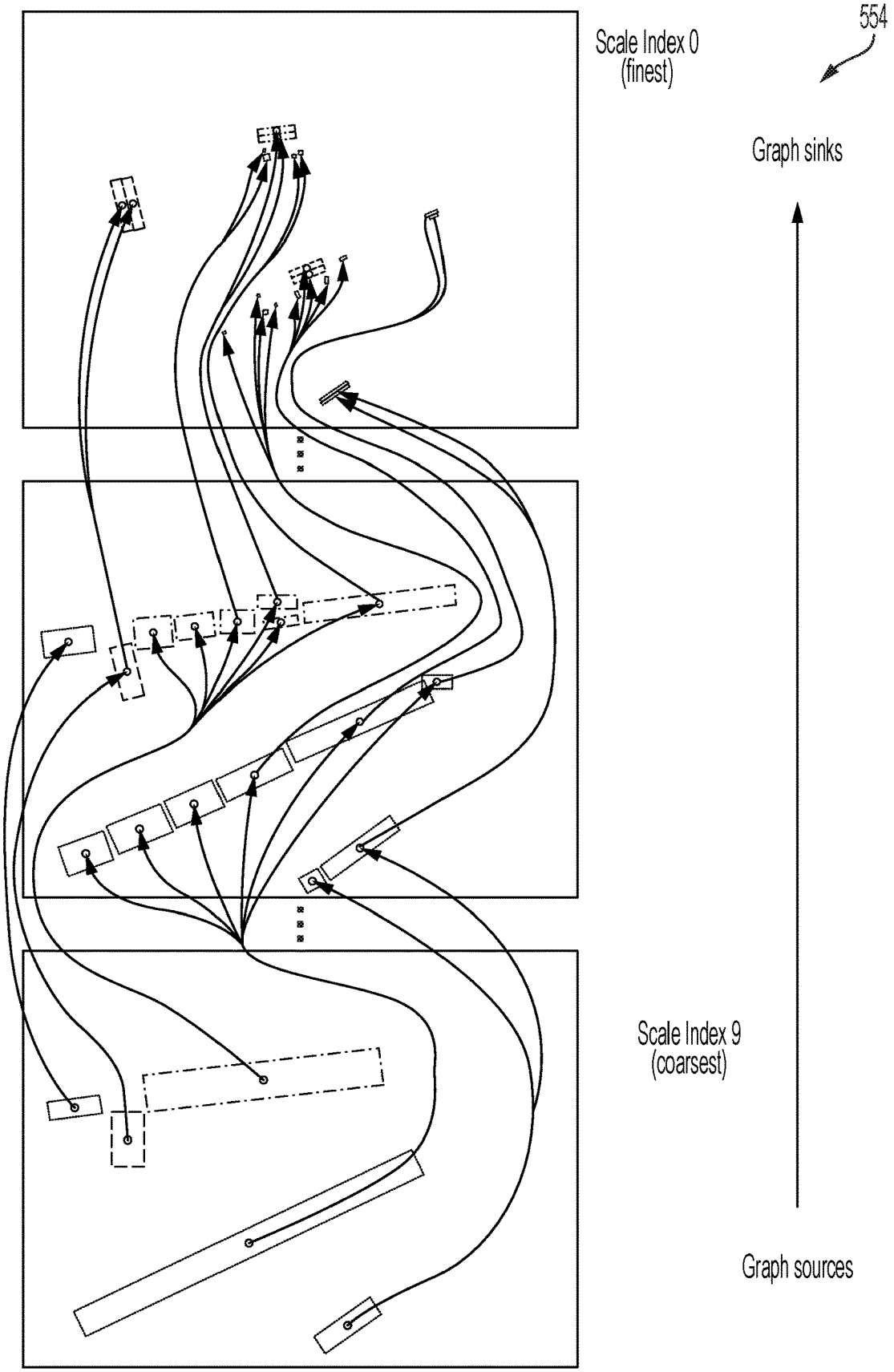
FIG. 6 schematically depicts a multiscale feature graph structure with respect to three of the scale levels of the scale space pyramid of FIG. 4.

Referring to FIG. 6, a simplified example of the multiscale feature graph structure 554 is depicted. As with FIG. 5, only three of the scale levels of the ten shown in FIG. 4 are shown. It is noted that the graph building algorithm can be demonstrated in this simplified example without loss of generalization.

Referring to FIG. 6, arrows indicate edges that have been identified by the graph building algorithm. Separate groups of feature candidate bounding boxes 553 that have no connecting edges might be referred to as "subgraphs." In FIG. 6, there are five subgraphs. In addition to the edge arrows, the rectangles within the same subgraph have been drawn with the same dashed line type.

The subgraphs shown in FIG. 6 all have a single source node in the coarsest scale level and may have multiple sink nodes, where a sink node (or sink vertex) is a node with no associated "child" nodes that intersect with it in finer scale levels. It is noted that in some cases a subgraph may have more than one source node and that a source node could come from any scale level in the pyramid. Similarly, it is noted that a graph could have one or more sink nodes, which could also come from any scale level. In general, source nodes will tend to come from coarser scales and sink nodes from finer scales respectively.

The purpose of the multiscale feature graph structure 554 (e.g., as the generated multiscale candidate graph 418 of the multiscale candidate detection function of block 408) is to establish context and links between feature candidate bounding boxes 553 that were detected from separate scales. In some embodiments, this could be of benefit to subsequent processing stages in the Camera Feature Extraction (CFE) algorithm 10 by allowing the option to examine a compound light feature, such as a continuous skylight or a substantially rectangular light comprised of multiple fluorescent tubes, at different levels of detail. For example, for a continuous skylight feature, one subsequent processing step might utilize a rectangle that encapsulates the whole skylight. A different processing step could then utilize the hierarchical relationship encoded in the subgraph to use bounding boxes 553 correlating to the individual panels that comprise the same skylight.

Some other scenarios in which the scale-space relationships captured in the graph may be helpful to include situations where light features are partially occluded by other objects. For example, at finer scales a light feature could be broken up into multiple detections due to a partial occlusion but further up the subgraph might be a detection that outlines the whole light feature. The multiscale feature graph (e.g., as the multiscale candidate graph 418) marks the end of the feature candidate detection function 22 in FIG. 3. The multiscale feature graph structure 554 is passed on to the feature candidate generation and categorization function 24.

Figure 7:
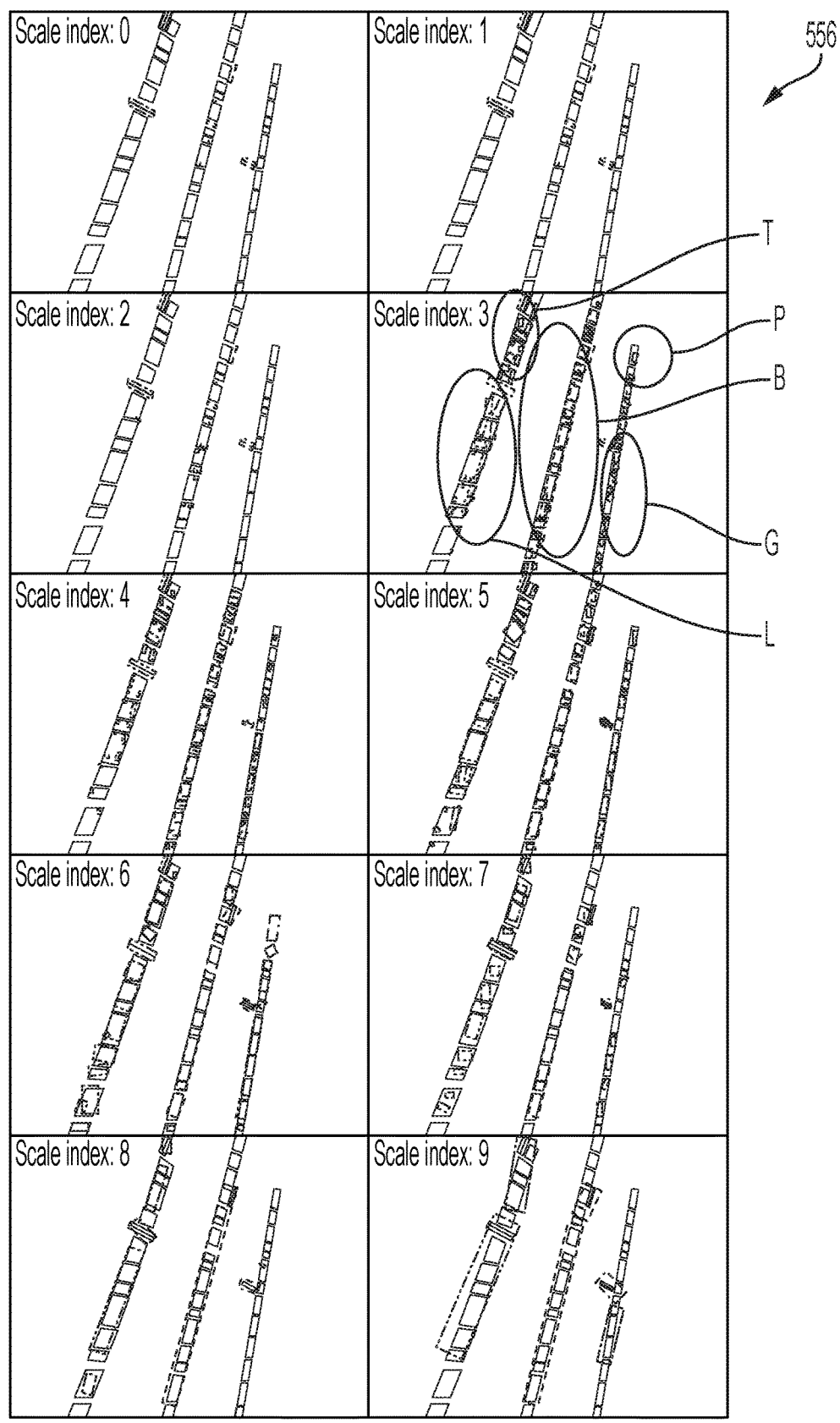
FIG. 7 depicts, in association with the feature candidate generation and categorization function of FIG. 3, a plurality of low-level multiscale feature candidates from ten scales according to one or more embodiments shown and described herein.
Figure 8:
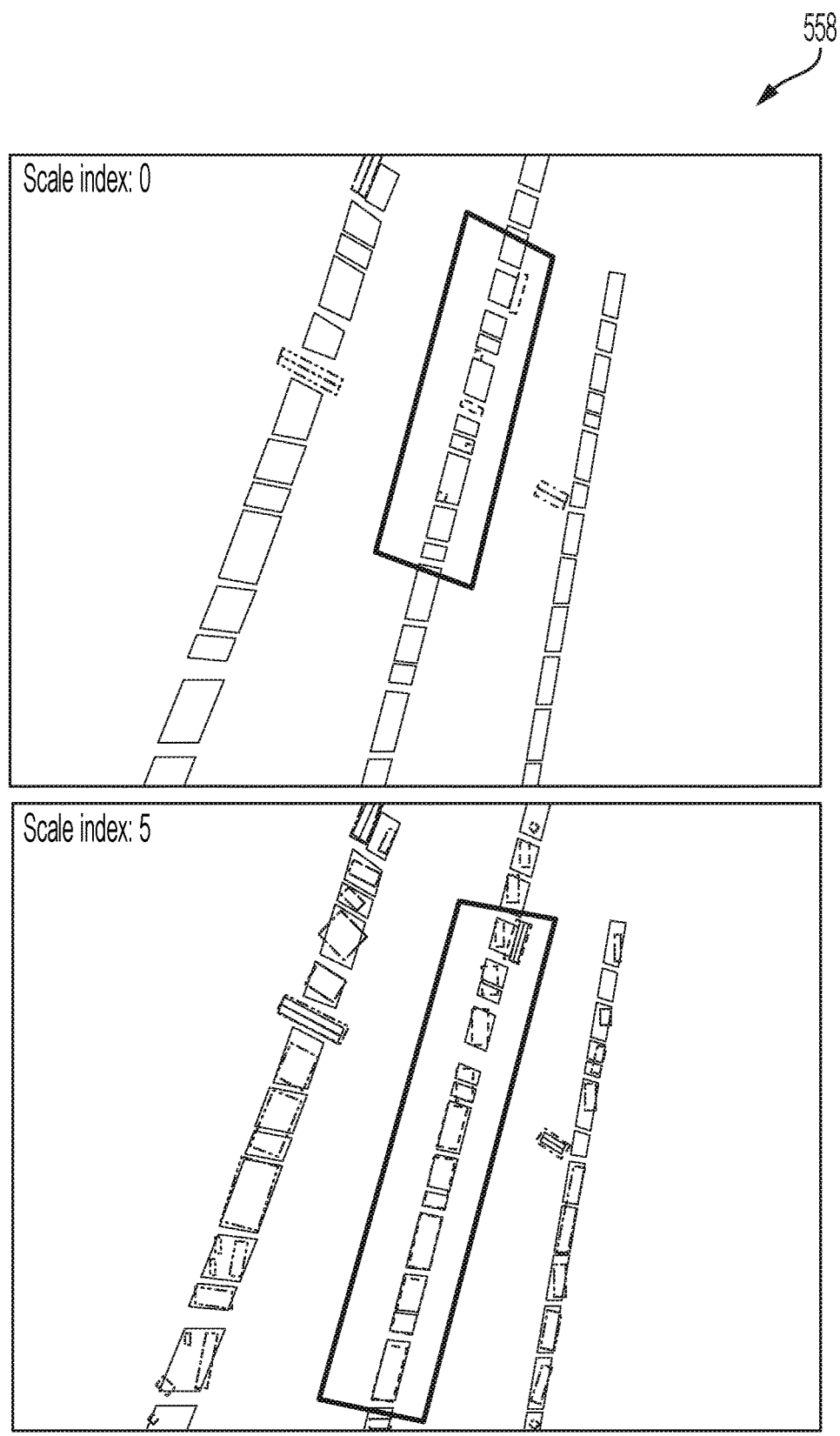
FIG. 8 depicts a best fit scale for low and high scales from the ten scales of FIG. 7.

Referring to FIGS. 3 and 7-8, in the feature candidate generation and categorization function 24, low-level multiscale feature candidates (MFC) as input from block 418 are processed in block 410 to generate ceiling light candidates and categorize those candidates into isolated light candidates 411B or skylight candidates 411A.

Low-level feature candidates may be associated into graphs across multiple scales. FIG. 7 demonstrates candidates from 10 scales 556. A same color may separate candidate subsets (e.g., teal T, pink P, blue B, green G, and lavender L) and indicate candidates of the same color belong to a same candidate graph. Scale indexes are noted on the top left corner of the scales 556 of FIG. 7. For each candidate graph, a best-fit scale is found in block 410 from both low scales, e.g. scale 0 to 2, and high scales, e.g. scale 3-9 respectively. A best-fit scale is indicative of the scale in which all candidates (e.g. bounding boxes 553) fit ceiling lights the best compared to the other scales. FIG. 8 demonstrates a best fit scale 558 for both low and high scales for a central subset candidate graph (e.g., of blue B). Some graphs may be discarded if candidates only appear in minority scales. For instance, another subset candidate graph (e.g., of pink P) on the top right only has candidates in scale 3 to 6.

In the best-fit scales, one ceiling light may be split into multiple candidates. Candidates may be merged based on distance between candidate borders recursively. The merged candidates may then be categorized into isolated light and skylight candidates by size. Candidates in the best-fit scale of high scales in block 410 are used to generate both isolated light candidates 411B and skylight candidates 411A. Candidates in the best-fit scale of low scales in block 410 are used to generate isolated light candidates 411B. Some candidates may be filtered out according to ratio and size check.

There may be duplicated isolated light candidates generated from both low and high best-fit scales in block 410. Candidates from the high scale may be passed on to next-step process if there are duplications found in the low scale. Otherwise, isolated light candidates from high scale may be discarded. In embodiments, all skylight candidates 411A are passed on to next-step process. Some isolated light candidates 411B may overlap with skylight candidates 411A.

Figure 9:
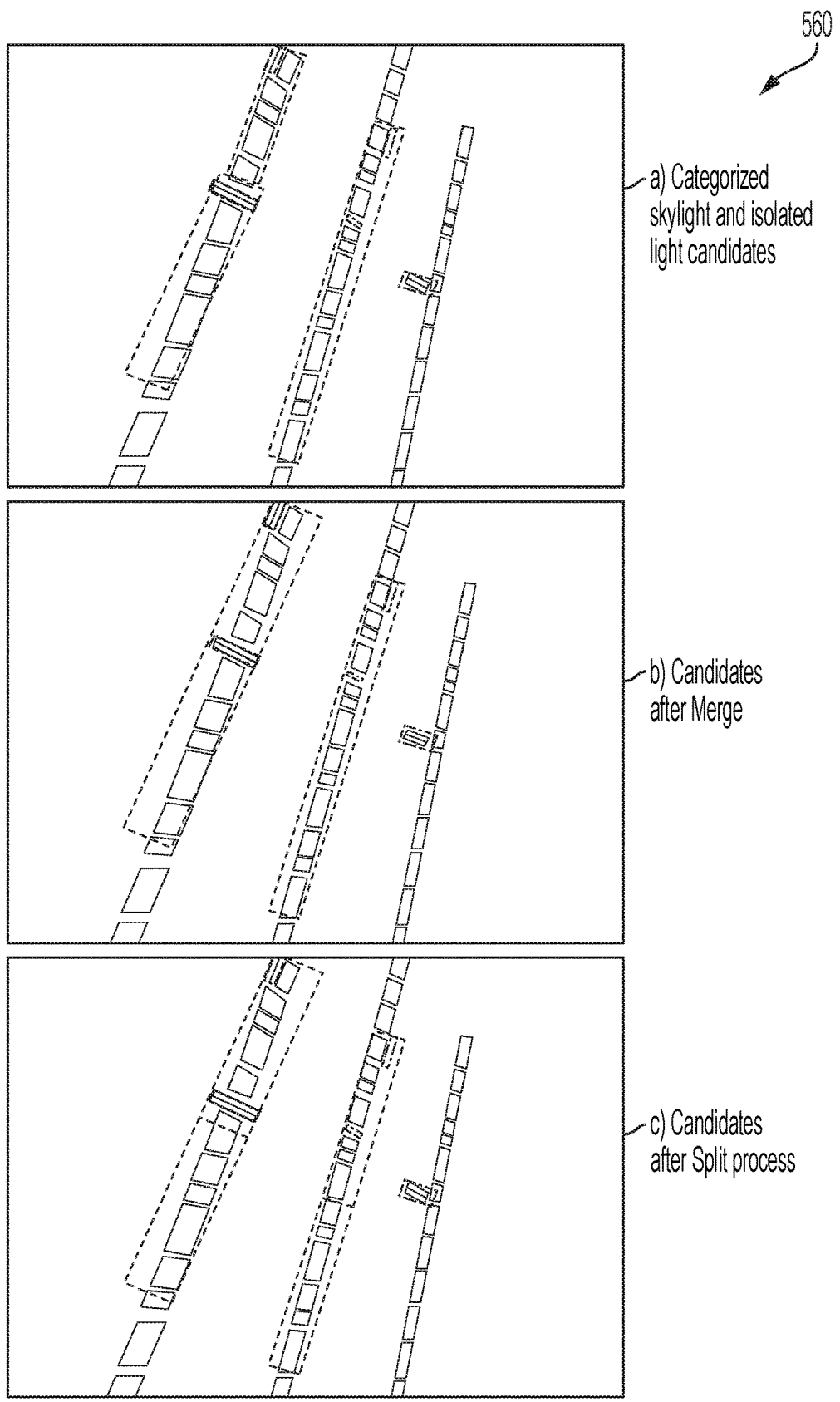
FIG. 9 depicts, in association with the feature extraction function of FIG. 3, a merge and split function as applied to feature candidates to generate merged and split candidates according to one or more embodiments shown and described herein.

Referring to FIGS. 3 and 9, in the feature extraction function 50, skylight candidates 411A generated from feature candidate generation and categorization function 24 may not fit skylight lights well due to the variation of the gaps between skylight panels. Skylight candidates 411A may be merged in block 412 based on area ratio recursively. FIG. 9 shows frames 560 and demonstrates the skylight candidates 411A before the merge in a frame 560a and after the merge in a frame 560b.

In some embodiments, it may be beneficial to the quality of the edge images if long bounding boxes 553 are split into two or more bounding boxes 553 prior to the execution of the threshold and create edge image function as described in U.S. Pat. No. 9,880,009 to Crown Equipment Corp., which is incorporated by reference in its entirety above.

Due to view perspective from camera and light condition change, the skylight panels in both ends of long skylight candidates map may appear quite different regarding size and brightness. A split process in block 410 may then, after the merge, simply split some long skylight candidates 411A into two parts to increase the consistency of skylight panel appearance, as shown in a frame 560c of FIG. 9 demonstrating the split results.

Figure 11:
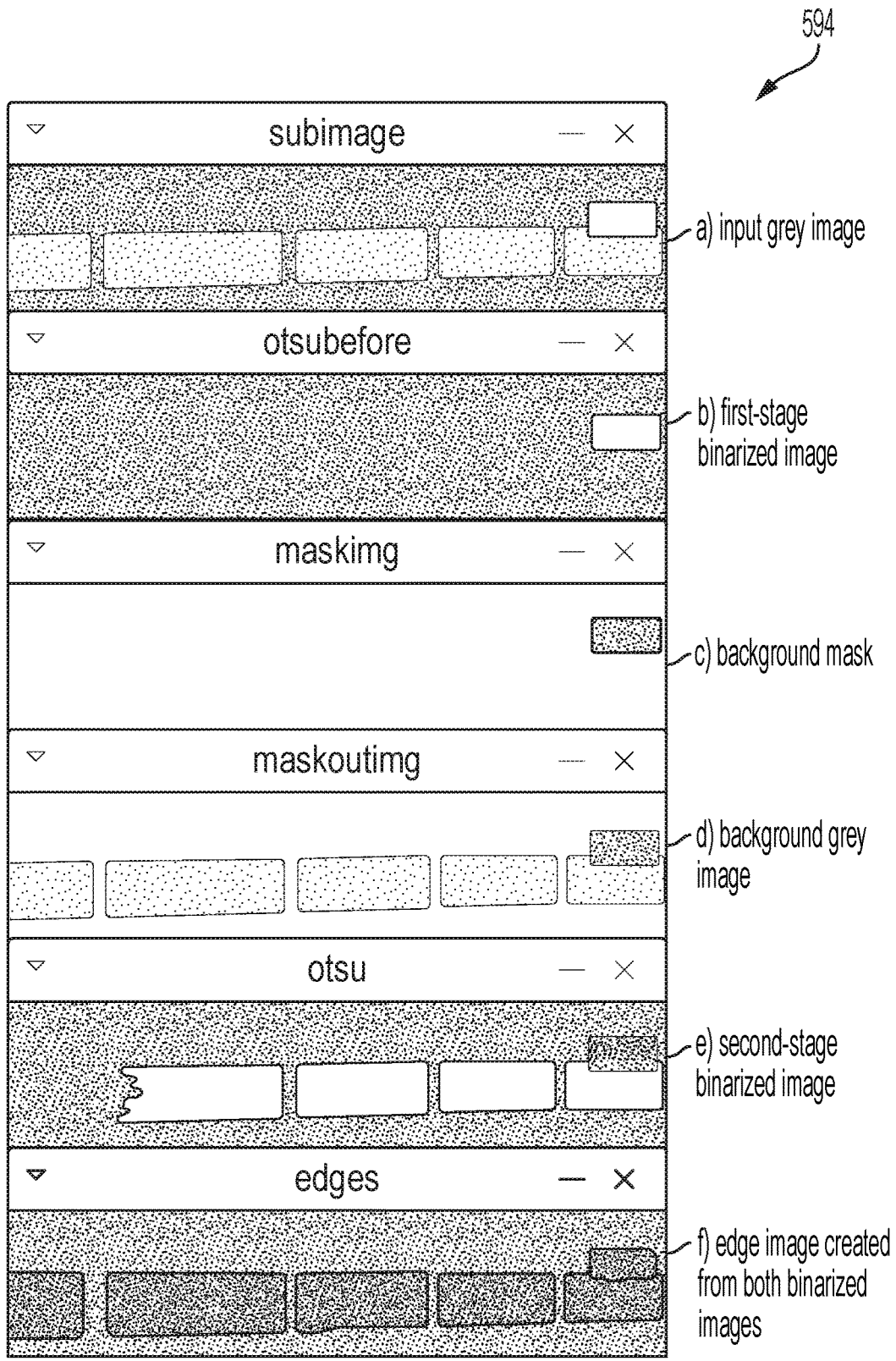
FIG. 11 depicts a two stage thresholding example as applied to skylight candidates according to one or more embodiments shown and described herein.

Referring to FIG. 11, and the feature extraction function 50, merged and split skylight candidates 413 generated from block 412 are passed on to an extract skylight process of block 414A to extract skylight corner features. By way of example, and not as a limitation, this extract skylight process of block 414A, which is similar to the process skylight function in U.S. Pat. No. 9,880,009 to Crown Equipment Corp. that is incorporated by reference in its entirety above.

To create a more robust image, a multiple stage thresholding process is introduced in a creating edge image function of the extract skylights function 414A. For example, before calculating edge images, input grey image candidates may be binarized to foreground (ceiling lights) and background. Some sites may have relatively bright isolated lights and dark skylights. The adaptive threshold may only pick up the bright isolated lights and not the skylights. Given a candidate, if the foreground ratio after the first binarization is below certain value, another binarization may be applied to background (masked out foreground) again. This binarization process may be applied recursively until the ratio of all foreground area over defined value. FIG. 11 demonstrates an example of two stage thresholding 594.

Figure 10:
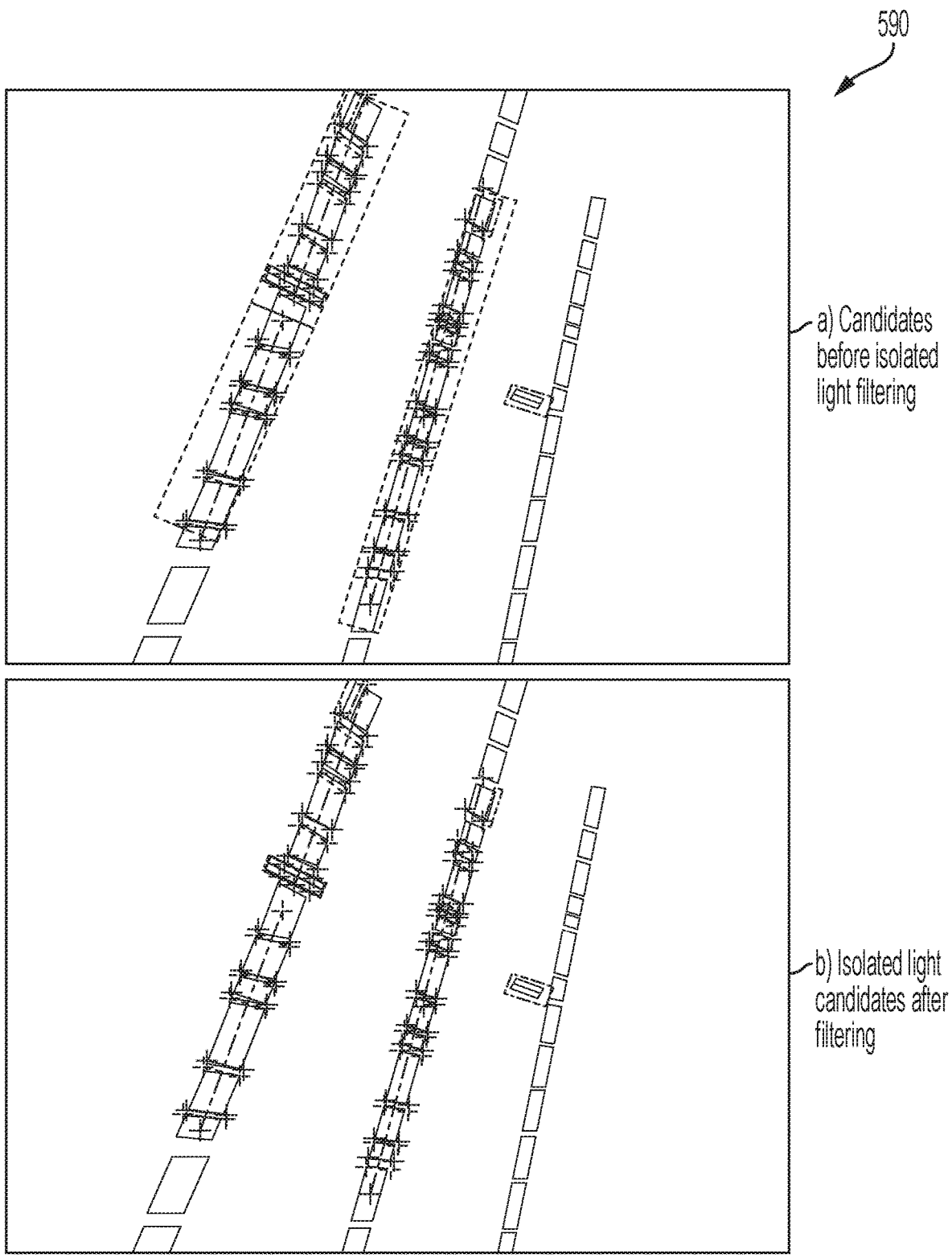
FIG. 10 depicts before and after isolated light filter processing images of merged and split images according to one or more embodiments shown and described herein.

Referring to FIGS. 3 and 10, and the filter block 415, a filter isolated light candidates process of the filter block 415 may take extracted skylight feature corners from skylight feature extractions 426 and isolated light candidates 411B as inputs, and report filtered isolated light candidates as filtered candidates 419 to extract isolated lights in block 414B and generate isolated light feature extractions 416. In embodiments, active targets are extracted in block 414C to generate active target extractions 427 to input into the coordinate frame 52A for conversion in the postprocessing 52 described in greater detail below.

In embodiments, isolated light candidates 411B from the feature candidate generation and categorization may be noisy. Some skylight panels may be reported as isolated light candidates 411B. If an isolated light candidate 411B is overlapping with any skylight candidates 411A which have enough skylight corner features extracted, the isolated light candidate 411B is discarded (for example, in filter block 415). In embodiments, a filter isolated light candidates process of the filter block 415 of FIG. 3 may take isolated light candidates 411B as inputs, and report filtered isolated light candidates as filtered candidates 419 to extract isolated lights in block 414B and generate isolated light feature extractions 416.

This process of filter block 415 may filter out some true isolated light candidates which appear close to skylights. Frames 590 of FIG. 10 demonstrate a before frame 590a before the isolated light filtering process and an after frame 590b after the isolated light filtering process of filter block 415.

Filtered isolated light candidates 419 may then be processed in an extract isolated lights function of block 414B to report isolated light feature extractions 416. Isolated light features of the isolated light feature extractions 416 may be the centroids of the input candidates, as described in U.S. Pat. No. 9,880,009 to Crown Equipment Corp. that is incorporated by reference in its entirety above.

Both skylight feature extractions 426 and isolated light extractions 416 may be reported in cropped and shifted image frame. As described in U.S. Pat. No. 9,880,009 to Crown Equipment Corp. that is incorporated by reference in its entirety above, a convert coordinate frame process in block 52A may be configured to convert the extraction coordinates back to original image coordinates for the postprocessing function 52 prior to reporting to the EBL in block 54.

It should now be understood that embodiments described herein can be utilized to navigate the industrial vehicle through the warehouse utilizing an illumination-invariant feature detection. Moreover, the embodiments described herein can have particular utility in buildings, e.g., warehouses that are round light sparse or lighted primarily by skylights and natural sources of illumination. Accordingly, the illumination-invariant feature detection described herein can be utilized to increase the environmental efficiency of a warehouse. For example, during day light hours the use of electricity can be reduced because the industrial vehicles described herein can be navigated through the use of naturally illuminated skylights. Moreover, the embodiments described herein can increase the robustness of the EBL through the use of illumination-invariant feature detection by employing the CFE algorithm 10 for sites in which illumination levels are variable and/or include an at least partially obstructed line of sight illumination to affect luminosity, such that the illumination variance and/or obstruction is mitigated. Moreover, the increased robustness of the EBL can reduce the environmental costs of operating a warehouse with industrial vehicles, i.e., mileage caused by localization error can be mitigated, which can reduce the power consumed by the industrial vehicle and the maintenance costs of the industrial vehicle.

For the purposes of describing and defining the present invention, it is noted that reference herein to a characteristic of the subject matter of the present disclosure being a "function of" a parameter, variable, or other characteristic is not intended to denote that the characteristic is exclusively a function of the listed parameter, variable, or characteristic. Rather, reference herein to a characteristic that is a "function" of a listed parameter, variable, etc., is intended to be open ended such that the characteristic may be a function of a single parameter, variable, etc., or a plurality of parameters, variables, etc.

It is also noted that recitations herein of "one or more" component, element, etc., should not be used to create an inference that the alternative use of the articles "a" or "an" should be limited to a single component, element, etc.

It is noted that recitations herein of a component of the present disclosure being "configured" in a particular way, to embody a particular property, or to function in a particular manner, are structural recitations, as opposed to recitations of intended use. More specifically, the references herein to the manner in which a component is "configured" denotes an existing physical condition of the component and, as such, is to be taken as a definite recitation of the structural characteristics of the component.

For the purposes of describing and defining the present invention it is noted that the terms "substantially" and "approximate" are utilized herein to represent the inherent degree of uncertainty that may be attributed to any quantitative comparison, value, measurement, or other representation. The terms "substantially" and "approximate" are also utilized herein to represent the degree by which a quantitative representation may vary from a stated reference without resulting in a change in the basic function of the subject matter at issue.

Having described the subject matter of the present disclosure in detail and by reference to specific embodiments thereof, it is noted that the various details disclosed herein should not be taken to imply that these details relate to elements that are essential components of the various embodiments described herein, even in cases where a particular element is illustrated in each of the drawings that accompany the present description. Further, it will be apparent that modifications and variations are possible without departing from the scope of the present disclosure, including, but not limited to, embodiments defined in the appended claims. More specifically, although some aspects of the present disclosure are identified herein as preferred or particularly advantageous, it is contemplated that the present disclosure is not necessarily limited to these aspects.

It is noted that one or more of the following claims utilize the term "wherein" as a transitional phrase. For the purposes of defining the present invention, it is noted that this term is introduced in the claims as an open-ended transitional phrase that is used to introduce a recitation of a series of characteristics of the structure and should be interpreted in like manner as the more commonly used open-ended preamble term "comprising."

What is claimed is:

1. An industrial vehicle comprising a drive mechanism, a steering mechanism, a vehicle controller, a camera, and a navigation module, wherein:
   the camera is communicatively coupled to the navigation module;
   the vehicle controller is responsive to commands from the navigation module;
   the drive mechanism and the steering mechanism are responsive to commands from the vehicle controller;
   the camera is configured to capture an input image of a ceiling of a warehouse comprising one or more skylights, one or more ceiling lights, one or more active targets, or combinations thereof; and the navigation module is configured to identify the one or more skylights, the one or more ceiling lights, the one or more active targets, or combinations thereof, by executing machine readable instructions to create a Gaussian scale space pyramid from the input image of the ceiling of the warehouse, wherein the Gaussian scale space pyramid comprises a plurality of scale space images, calculate a trace of Hessian response for each scale space image of the plurality of scale space images within the Gaussian scale space pyramid, build a trace of Hessian response pyramid based on the Gaussian scale space pyramid, build a multiscale candidate graph utilizing the trace of Hessian response pyramid, utilize the multiscale candidate graph to identify one or more candidates comprising one or more skylight candidates, one or more ceiling light candidates, one or more active target candidates, or combinations thereof, in the input image of the ceiling, subject the one or more candidates to candidate feature processing to identify a valid identification of the one or more candidates as the one or more skylights, the one or more ceiling lights, the one or more active targets, or combinations thereof, in the warehouse, and send commands to the vehicle controller to navigate the industrial vehicle through the warehouse based upon the valid identification.

2. The industrial vehicle of claim 1, wherein:
the navigation module executes the machine readable instructions to identify the valid identification of the one or more candidates as the one or more ceiling lights; and
the one or more ceiling lights comprise one or more rectangular ceiling lights characterized by different rates of image intensity change along longitudinal and transverse axial directions, one or more circular ceiling lights characterized by a symmetric rate of image intensity change, or combinations thereof.

3. The industrial vehicle of claim 1, wherein the navigation module executes the machine readable instructions to:
identify the valid identification of the one or more candidates as the one or more skylights, the one or more ceiling lights, and the one or more active targets;
identify the one or more skylights based on a recognition of different rates of image intensity change along longitudinal and transverse axial directions in the input image;
identify the one or more ceiling lights based on a recognition of a symmetric rate of image intensity change or by different rates of image intensity change along longitudinal and transverse axial directions in the input image; and
identify the one or more active targets based on a recognition of a plurality of symmetric rates of intensity change within a threshold distance in the input image.

4. The industrial vehicle of claim 3, wherein the one or more active targets comprise one or more optical light emitting diode (LED) features.

5. The industrial vehicle of claim 1, wherein the navigation module is further configured to execute machine readable instructions to detect one or more light features of varying brightness of the one or more candidates, one or more light features of varying size of the one or more candidates, or combinations thereof.

6. The industrial vehicle of claim 1, wherein the navigation module is further configured to execute machine readable instructions to:
build the multiscale candidate graph based on each scale space image in the trace of Hessian response pyramid;
utilize the multiscale candidate graph to identify the one or more candidates by generating one or more bounding boxes for each scale space image and thresholding each scale space image in the trace of Hessian response pyramid against a threshold value to utilize each scale space image at or above the threshold value.

7. The industrial vehicle of claim 6, wherein:
the plurality of scale space images comprises a range from a low value fine scale index to a high value coarse scale index comprising a value higher than the low value fine scale index;
the navigation module builds the multiscale candidate graph by processing scale space images beginning from the high value coarse index to down to the low value fine scale index to build up inter-image graph edge connections between one or more graph nodes from each scale space image; and
the one or more graph nodes are associated with one or more bounding boxes in each scale space image.

8. The industrial vehicle of claim 1, wherein the navigation module is further configured to execute machine readable instructions to:
generate one or more best fit candidates from the one or more candidates;
input the one or more best fit candidates into a feature extraction function of the candidate feature processing to generate one or more candidate feature extractions; and
utilize the one or more candidate feature extractions from the feature extraction function to identify the valid identification of the one or more candidates as the one or more skylights, the one or more ceiling lights, the one or more active targets, or combinations thereof.

9. The industrial vehicle of claim 8, wherein the one or more best fit candidates are categorized as the one or more candidates comprising the one or more skylight candidates, the one or more ceiling light candidates, the one or more active target candidates, or combinations thereof.

10. The industrial vehicle of claim 8, wherein the navigation module is further configured to execute machine readable instructions to:
apply a merge and split candidates function to merge and split one or more bounding boxes associated with the one or more skylight candidates to generate one or more split bounding boxes when the one or more best fit candidates are categorized as the one or more skylight candidates; and
extract one or more features from the one or more split bounding boxes to generate the one or more candidate feature extractions.

11. The industrial vehicle of claim 8, wherein the navigation module is further configured to execute machine readable instructions to filter the one or more best fit candidates when the one or more best fit candidates are categorized as the one or more ceiling light candidates.

12. The industrial vehicle of claim 8, wherein the navigation module is further configured to execute machine readable instructions to filter the one or more best fit candidates to generate the one or more candidate feature extractions.

13. The industrial vehicle of claim 1, wherein the navigation module is further configured to execute machine readable instructions to:
- generate one or more isolated light feature extractions from the one or more ceiling light candidates comprising one or more isolated light candidates;
- generate one or more skylight feature extractions from the one or more skylight candidates; and
- remove the one or more isolated light candidates comprising the one or more isolated light feature extraction that intersect with the one or more skylight feature extractions.

14. The industrial vehicle of claim 1, wherein the navigation module is further configured to execute machine readable instructions to generate a feature candidate bounding box for each of the one or more candidates in the candidate feature processing.

15. The industrial vehicle of claim 14, wherein the navigation module is further configured to execute machine readable instructions to extract one or more features from each feature candidate bounding box.

16. The industrial vehicle of claim 1, wherein the navigation module is further configured to execute machine readable instructions to:
- generate feature coordinates of the one or more candidates based on the valid identification; and
- send commands to the vehicle controller to navigate the industrial vehicle through the warehouse based upon the valid identification and the feature coordinates.

17. An industrial vehicle comprising a drive mechanism, a steering mechanism, a vehicle controller, a camera, and a navigation module, wherein:
- the camera is communicatively coupled to the navigation module;
- the vehicle controller is responsive to commands from the navigation module;
- the drive mechanism and the steering mechanism are responsive to commands from the vehicle controller;
- the camera is configured to capture an input image of a ceiling of a warehouse comprising one or more skylights, one or more ceiling lights, one or more active targets, or combinations thereof; and
- the navigation module is configured to identify the one or more skylights, the one or more ceiling lights, the one or more active targets, or combinations thereof, by executing machine readable instructions to
  - create a Gaussian scale space pyramid from the input image of the ceiling of the warehouse, wherein the Gaussian scale space pyramid comprises a plurality of scale space images,
  - calculate a trace of Hessian response for each scale space image of the plurality of scale space images within the Gaussian scale space pyramid,
  - build a trace of Hessian response pyramid based on the Gaussian scale space pyramid,
  - utilize the trace of Hessian response pyramid to identify one or more candidates comprising one or more skylight candidates, one or more ceiling light candidates, and one or more active target candidates in the input image of the ceiling by generating one or more bounding boxes for each scale space image and thresholding each scale space image in the trace of Hessian response pyramid against a threshold value to utilize each scale space image at or above the threshold value,
  - detect one or more light features of varying brightness of the one or more candidates, one or more light features of varying size of the one or more candidates, or combinations thereof,
  - subject the one or more candidates to candidate feature processing to identify a valid identification of the one or more candidates as the one or more skylights, the one or more ceiling lights, and the one or more active targets in the warehouse, and
  - send commands to the vehicle controller to navigate the industrial vehicle through the warehouse based upon the valid identification.

18. The industrial vehicle of claim 17, wherein the navigation module is further configured to execute machine readable instructions to:
- build a multiscale candidate graph based on each scale space image in the trace of Hessian response pyramid, wherein
  - the plurality of scale space images comprises a range from a low value fine scale index to a high value coarse scale index comprising a value higher than the low value fine scale index;
  - the navigation module builds the multiscale candidate graph by processing scale space images beginning from the high value coarse index to down to the low value fine scale index to build up inter-image graph edge connections between one or more graph nodes from each scale space image; and
  - the one or more graph nodes are associated with one or more bounding boxes in each scale space image.

19. The industrial vehicle of claim 17, wherein the navigation module is further configured to execute machine readable instructions to:
- generate one or more best fit candidates from the one or more candidates;
- input the one or more best fit candidates into a feature extraction function of the candidate feature processing to generate one or more candidate feature extractions; and
- utilize the one or more candidate feature extractions from the feature extraction function to identify the valid identification of the one or more candidates as the one or more skylights, the one or more ceiling lights, and the one or more active targets.

20. A method for navigating an industrial vehicle, the method comprising:
- operating the industrial vehicle in a warehouse, the industrial vehicle comprising a drive mechanism, a steering mechanism, a vehicle controller, a camera, and a navigation module, wherein (i) the camera is communicatively coupled to the navigation module, (ii) the vehicle controller is responsive to commands from the navigation module, and (iii) the drive mechanism and the steering mechanism are responsive to commands from the vehicle controller;
- capturing an input image of a ceiling of the warehouse comprising one or more skylights, one or more ceiling lights, one or more active targets, or combinations thereof by the camera;
- creating a Gaussian scale space pyramid from the input image of the ceiling of the warehouse utilizing the navigation module, wherein the Gaussian scale space pyramid comprises a plurality of scale space images;
- calculating a trace of Hessian response for each scale space image of the plurality of scale space images within the Gaussian scale space pyramid;
- building a trace of Hessian response pyramid based on the Gaussian scale space pyramid;

building a multiscale candidate graph utilizing the trace of Hessian response pyramid;

utilizing the multiscale candidate graph to identify one or more candidates comprising one or more skylight candidates, one or more ceiling light candidates, one or more active target candidates, or combinations thereof, in the input image of the ceiling using the navigation module;

subjecting the one or more candidates to candidate feature processing to identify as a valid identification of the one or more candidates as the one or more skylights, the one or more ceiling lights, the one or more active targets, or combinations thereof, in the warehouse using the navigation module; and send commands from the navigation module to the vehicle controller to navigate the industrial vehicle through the warehouse based upon the valid identification.

21. The industrial vehicle of claim 7, wherein:

the navigation module executes the machine readable instructions to identify the valid identification of the one or more candidates as the one or more ceiling lights; and the one or more ceiling lights comprise one or more rectangular ceiling lights characterized by different rates of image intensity change along longitudinal and transverse axial directions, one or more circular ceiling lights characterized by a symmetric rate of image intensity change, or combinations thereof.

22. The industrial vehicle of claim 7, wherein the navigation module executes the machine readable instructions to:

identify the valid identification of the one or more candidates as the one or more skylights, the one or more ceiling lights, and the one or more active targets;

identify the one or more skylights based on a recognition of different rates of image intensity change along longitudinal and transverse axial directions in the input image;

identify the one or more ceiling lights based on a recognition of a symmetric rate of image intensity change or by different rates of image intensity change along longitudinal and transverse axial directions in the input image; and identify the one or more active targets based on a recognition of a plurality of symmetric rates of intensity change within a threshold distance in the input image.

23. The industrial vehicle of claim 22, wherein the one or more active targets comprise one or more optical light emitting diode (LED) features.

24. The industrial vehicle of claim 7, wherein the navigation module is further configured to execute machine readable instructions to detect one or more light features of varying brightness of the one or more candidates, one or more light features of varying size of the one or more candidates, or combinations thereof.

25. The industrial vehicle of claim 7, wherein the navigation module is further configured to execute machine readable instructions to:

generate one or more best fit candidates from the one or more candidates;

input the one or more best fit candidates into a feature extraction function of the candidate feature processing to generate one or more candidate feature extractions; and utilize the one or more candidate feature extractions from the feature extraction function to identify the valid identification of the one or more candidates as the one or more skylights, the one or more ceiling lights, the one or more active targets, or combinations thereof.

26. The industrial vehicle of claim 25, wherein the one or more best fit candidates are categorized as the one or more candidates comprising the one or more skylight candidates, the one or more ceiling light candidates, the one or more active target candidates, or combinations thereof.

27. The industrial vehicle of claim 25, wherein the navigation module is further configured to execute machine readable instructions to:

apply a merge and split candidates function to merge and split one or more bounding boxes associated with the one or more skylight candidates to generate one or more split bounding boxes when the one or more best fit candidates are categorized as the one or more skylight candidates; and extract one or more features from the one or more split bounding boxes to generate the one or more candidate feature extractions.

28. The industrial vehicle of claim 25, wherein the navigation module is further configured to execute machine readable instructions to filter the one or more best fit candidates when the one or more best fit candidates are categorized as the one or more ceiling light candidates.

29. The industrial vehicle of claim 25, wherein the navigation module is further configured to execute machine readable instructions to filter the one or more best fit candidates to generate the one or more candidate feature extractions.

30. The industrial vehicle of claim 7, wherein the navigation module is further configured to execute machine readable instructions to:

generate one or more isolated light feature extractions from the one or more ceiling light candidates comprising one or more isolated light candidates;

generate one or more skylight feature extractions from the one or more skylight candidates; and remove the one or more isolated light candidates comprising the one or more isolated light feature extraction that intersect with the one or more skylight feature extractions.

31. The industrial vehicle of claim 7, wherein the navigation module is further configured to execute machine readable instructions to generate a feature candidate bounding box for each of the one or more candidates in the candidate feature processing.

32. The industrial vehicle of claim 31, wherein the navigation module is further configured to execute machine readable instructions to extract one or more features from each feature candidate bounding box.

33. The industrial vehicle of claim 7, wherein the navigation module is further configured to execute machine readable instructions to:

generate feature coordinates of the one or more candidates based on the valid identification; and send commands to the vehicle controller to navigate the industrial vehicle through the warehouse based upon the valid identification and the feature coordinates.

* * * * *